United States Patent
Christian et al.

(10) Patent No.: US 12,250,183 B2
(45) Date of Patent: *Mar. 11, 2025

(54) METHOD, APPARATUS, AND COMPUTER PROGRAM PRODUCT FOR INITIATING AND EXECUTING A GROUP BASED COMMUNICATION BROWSER SESSION AND RENDERING A GROUP BASED COMMUNICATION INTERFACE

(71) Applicant: Salesforce, Inc., San Francisco, CA (US)

(72) Inventors: Mark Christian, Benicia, CA (US); John Rodgers, Vancouver (CA); James Whimpey, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/588,608

(22) Filed: Jan. 31, 2022

(65) Prior Publication Data

US 2022/0158957 A1    May 19, 2022

Related U.S. Application Data

(63) Continuation of application No. 16/010,036, filed on Jun. 15, 2018, now Pat. No. 11,271,878.

(51) Int. Cl.
*H04L 51/04* (2022.01)
*H04L 12/18* (2006.01)
(Continued)

(52) U.S. Cl.
CPC .......... *H04L 51/04* (2013.01); *H04L 12/1818* (2013.01); *H04L 67/02* (2013.01);
(Continued)

(58) Field of Classification Search
CPC . H04L 12/1818; H04L 67/02; H04L 67/2842; H04L 51/04; H04L 67/568; H04L 67/53; H04L 67/306
See application file for complete search history.

(56) References Cited

U.S. PATENT DOCUMENTS 9,225,707 B1 * 12/2015 de Sousa ................ H04L 63/08
11,271,878 B2 * 3/2022 Christian ............ G06F 16/9574
(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.
(Continued)

*Primary Examiner* — Dhairya A Patel
*Assistant Examiner* — Eui H Kim
(74) *Attorney, Agent, or Firm* — Holland & Hart LLP

(57) ABSTRACT

Provided is a computing device of a group based communication system configured to initiate and execute a group-based communication browser session. An example computing device is configured to receive a group-based communication browser session initiation request. After receiving a group-based communication browser session initiation request, the example computing device will determine whether the computing is connected to an Internet. If the computing device is determined to be connected to the Internet, the example computing device determine whether a group-based communication service cache is available. If the group-based communication service cache is available, the example computing device will fetch a group-based application asset set from the group-based communication service cache. Then the example computing device will determine whether a group-based communication browser cache is available. If the group-based communication
(Continued)

browser cache is available, the example computing device will fetch a group-based communication object set from the group-based communication browser cache based on a group-based communication browser cache hydration policy. Then the computing device will render a group-based communication interface using the fetched group-based application asset set and the fetched group-based communication object set.

20 Claims, 11 Drawing Sheets

(51) Int. Cl.
*H04L 67/02* (2022.01)
*H04L 67/306* (2022.01)
*H04L 67/53* (2022.01)
*H04L 67/568* (2022.01)

(52) U.S. Cl.
CPC .......... *H04L 67/568* (2022.05); *H04L 67/306* (2013.01); *H04L 67/53* (2022.05)

(56) References Cited

U.S. PATENT DOCUMENTS

| | | | | |
|---|---|---|---|---|
| 2005/0156873 | A1* | 7/2005 | Walter | H04L 51/04 345/156 |
| 2007/0172047 | A1* | 7/2007 | Coughlan | H04M 3/56 379/202.01 |
| 2011/0040718 | A1* | 2/2011 | Tendjoukian | H04L 67/5681 706/54 |
| 2015/0356634 | A1* | 12/2015 | Kallman | G06Q 10/10 705/14.66 |
| 2015/0379014 | A1* | 12/2015 | Xu | G06F 40/143 707/711 |
| 2016/0379599 | A1* | 12/2016 | Yeung | G06F 3/14 345/520 |
| 2018/0287982 | A1 | 10/2018 | Draeger et al. | |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became A $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

METHOD, APPARATUS, AND COMPUTER PROGRAM PRODUCT FOR INITIATING AND EXECUTING A GROUP BASED COMMUNICATION BROWSER SESSION AND RENDERING A GROUP BASED COMMUNICATION INTERFACE

RELATED APPLICATIONS

This application is a continuation of U.S. patent application Ser. No. 16/010,036, filed Jun. 15, 2018, the disclosure of which is incorporated herein by reference in its entirety.

BACKGROUND

Various messaging systems may support communication and collaboration among users across an enterprise. Applicant has identified a number of deficiencies and problems associated with collaborative communication environments. Through applied effort, ingenuity, and innovation, many of these identified problems have been solved by developing solutions that are included in embodiments of the present disclosure, many examples of which are described in detail herein.

BRIEF SUMMARY

In general, embodiments of the present invention provided herein include methods, apparatus, and computer program products for executing a group-based communication browser session.

In some embodiments of the present disclosure, an apparatus may be provided for initiating a group-based communication browser session the apparatus comprising at least one processor and at least one non-transitory memory including program code, the at least one non-transitory memory and the program code configured to, with the processor, cause the apparatus to receive a group-based communication browser session initiation request; determine whether the apparatus is connected to an Internet; in circumstances where the apparatus is determined to be connected to the Internet, determine whether a group-based communication service cache is available; in circumstances where the group-based communication service cache is available, fetch a group-based application asset set from the group-based communication service cache; determine whether a group-based communication browser cache is available; in circumstances where the group-based communication browser cache is available, fetch a group-based communication object set from the group-based communication browser cache based on a group-based communication browser cache hydration policy; and render a group-based communication interface using at least the fetched group-based application asset set and the fetched group-based communication object set.

In some embodiments, the memory including the program code is further configured to, with the processor, cause the apparatus to: in circumstances where the apparatus is not connected to the Internet, determine whether the group-based communication service cache is available; and in circumstances where the group-based communication service cache is available, fetch the group-based application asset set from the group-based communication service cache.

In some embodiments, the memory including the program code is further configured to, with the processor, cause the apparatus to: in circumstances where the group-based communication service cache is not available, render an error message.

In some embodiments, the rendering further uses a placeholder object set rendered in place of a group-based communication object set not available in the group-based communication browser cache.

In some embodiments, the memory including the program code is further configured to, with the processor, cause the apparatus to fetch the currently unavailable group-based communication object set from a group-based communication repository.

In some embodiments, the memory including the program code is further configured to, with the processor, cause the apparatus to: store the fetched group-based communication object set available in the group-based communication browser cache to a group-based communication store; store the fetched group-based application asset set to the group-based communication store; and store the fetched group-based communication object set not available in the group-based communication browser cache to the group-based communication store.

In some embodiments, the memory including the program code is further configured to, with the processor, cause the apparatus to selectively store one or more group-based communication objects and one or more group-based communication objects not available in the group-based communication browser cache previously stored to the group-based communication store to the group-based communication browser cache based on a pre-defined group-based communication browser cache retention policy.

In some embodiments, the memory including the program code is further configured to, with the processor, cause the apparatus to: receive a request to render an additional group-based communication object; determine whether the additional group-based communication object is available in the group-based communication store; in circumstances where the additional group-based communication object is available in the group-based communication store, fetch the additional group-based communication object from the group-based communication store; in circumstances where the additional group-based communication object is not available in the group-based communication store, determine whether the additional group-based communication object is available in the group-based communication browser cache; in circumstances where the additional group-based communication object is available in the group-based communication browser cache, fetch the additional group-based communication object from the group-based communication browser cache; and in circumstances where the additional group-based communication object is not available in the group-based communication browser cache, fetch the additional group-based communication object from the group-based communication repository.

In some embodiments, the memory including the program code is further configured to, with the processor, cause the apparatus to: in circumstances where the additional group-based communication object is not available in the group-based communication store, store the additional group-based communication object to the group-based communication store after fetching the additional group-based communication object.

In some embodiments, the memory including the program code is further configured to, with the processor, cause the apparatus to: receive a version indicator of one or more group-based communication objects locally stored from a group-based communication server; compare a version indicator previously stored in a local storage to the version indicator received; determine that the version indicator previously stored in a local storage and the version indicator received do not indicate the same version; delete the one or more group-based communication objects locally stored; fetch the one or more group-based communication objects from a group-based communication repository associated with the group-based communication server; determine that group-based communication browser session does not have a window focus; re-render the group-based communication interface using at least the fetched one or more group-based communication objects.

In another example embodiment, a method may be provided for initiating a group-based communication browser session in a group-based communication system comprising a group-based communication server, a client device, and a plurality of group-based communication channels. The method may include receiving a group-based communication browser session initiation request. The method may further include determining whether the apparatus is connected to an Internet; in circumstances where the apparatus is determined to be connected to the Internet, determining whether a group-based communication service cache is available; and in circumstances where the group-based communication service cache is available, fetching a group-based application asset set from the group-based communication service cache. The method may include determining whether a group-based communication browser cache is available; in circumstances where the group-based communication browser cache is available, fetching a group-based communication object set from the group-based communication browser cache based on a group-based communication browser cache hydration policy; and rendering a group-based communication interface using at least the fetched group-based application asset set and the fetched group-based communication object asset.

In some embodiments, the method further includes in circumstances where the apparatus is not connected to the Internet, determining whether the group-based communication service cache is available; and in circumstances where the group-based communication service cache is available, fetching the group-based application asset set from the group-based communication service cache.

In some embodiments, the method further includes in circumstances where the group-based communication service cache is not available, render an error message.

In some embodiments, the rendering further uses a placeholder object set rendered in place of a group-based communication object set not available in the group-based communication browser cache.

In some embodiments, the method further includes fetching the currently unavailable group-based communication object set from a group-based communication repository.

In some embodiments, the method further includes storing the fetched group-based communication object set available in the group-based communication browser cache to a group-based communication store; storing the fetched group-based application asset set to the group-based communication store; and storing the fetched group-based communication object set not available in the group-based communication browser cache to the group-based communication store.

In some embodiments, the method further includes selectively storing one or more group-based communication object set and one or more group-based communication object set not available in the group-based communication browser cache previously stored to the group-based communication store to the group-based communication browser cache based on a pre-defined group-based communication browser cache retention policy.

In some embodiments, the method further includes receiving a request to render an additional group-based communication object; determining whether the additional group-based communication object is available in the group-based communication store; in circumstances where the additional group-based communication object is available in the group-based communication store, fetching the additional group-based communication object from the group-based communication store; in circumstances where the additional group-based communication object is not available in the group-based communication store, determining whether the additional group-based communication object is available in the group-based communication browser cache; in circumstances where the additional group-based communication object is available in the group-based communication browser cache, fetching the additional group-based communication object from the group-based communication browser cache; and in circumstances where the additional group-based communication object is not available in the group-based communication browser cache, fetching the additional group-based communication object from the group-based communication repository.

In some embodiments, the method further includes in circumstances where the additional group-based communication object is not available in the group-based communication store, storing the additional group-based communication object to the group-based communication store after fetching the additional group-based communication object.

In some embodiments, the method further includes receiving a version indicator of one or more group-based communication objects locally stored from a group-based communication server; comparing a version indicator previously stored in a local storage to the version indicator received; determining that the version indicator previously stored in a local storage and the version indicator received do not indicate the same version; deleting the one or more group-based communication objects locally stored; fetching the one or more group-based communication objects from a group-based communication repository associated with the group-based communication server; determining that group-based communication browser session does not have a window focus; and re-rendering the group-based communication interface using at least the fetched one or more group-based communication objects.

BRIEF DESCRIPTION OF THE DRAWINGS

Figure 1:
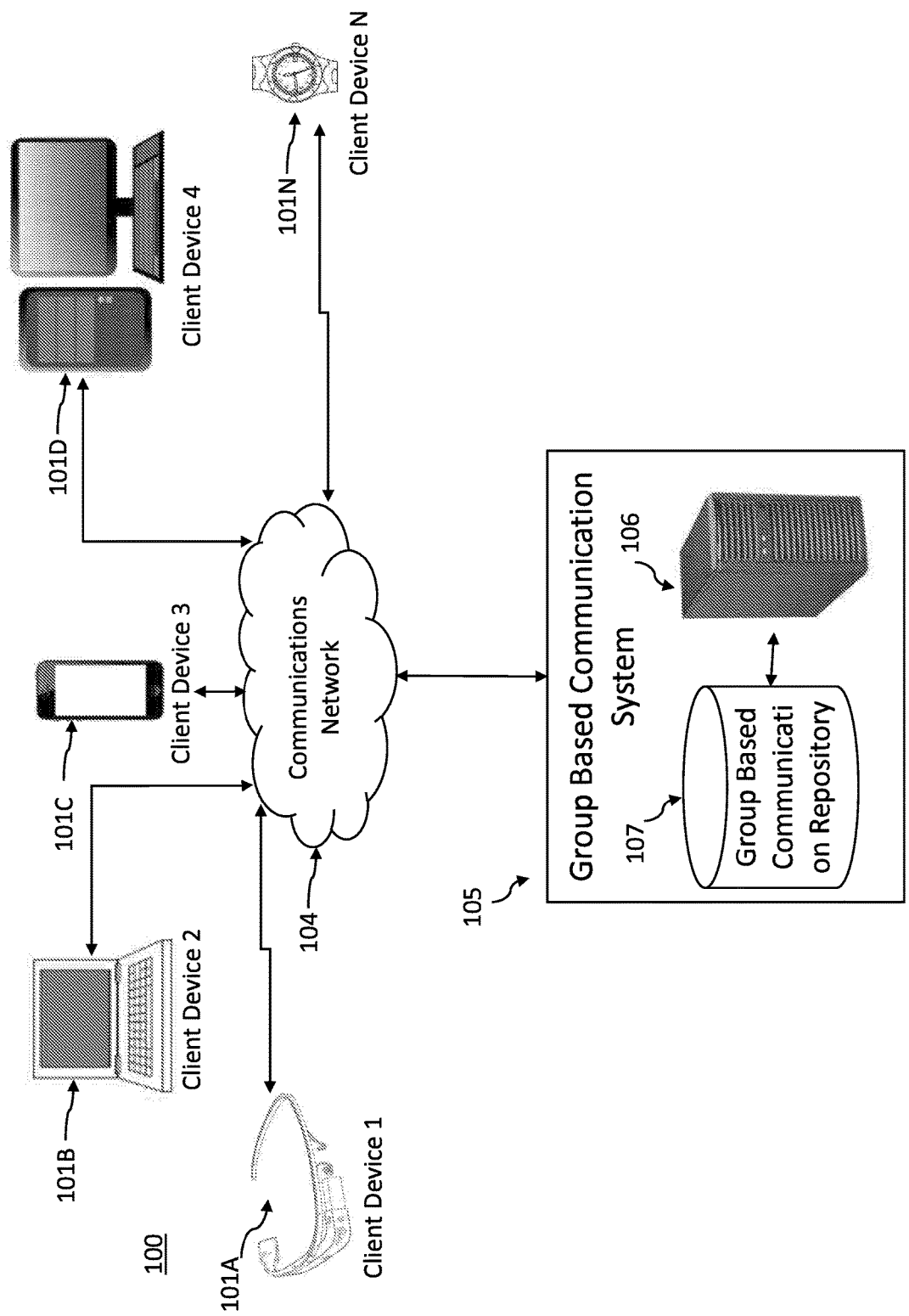

Having thus described the disclosure in general terms, reference will now be made to the accompanying drawings, which are not necessarily drawn to scale, and wherein:

FIG. 1 shows an example computing system 100 within which embodiments of the present invention may operate.

Figure 2A:
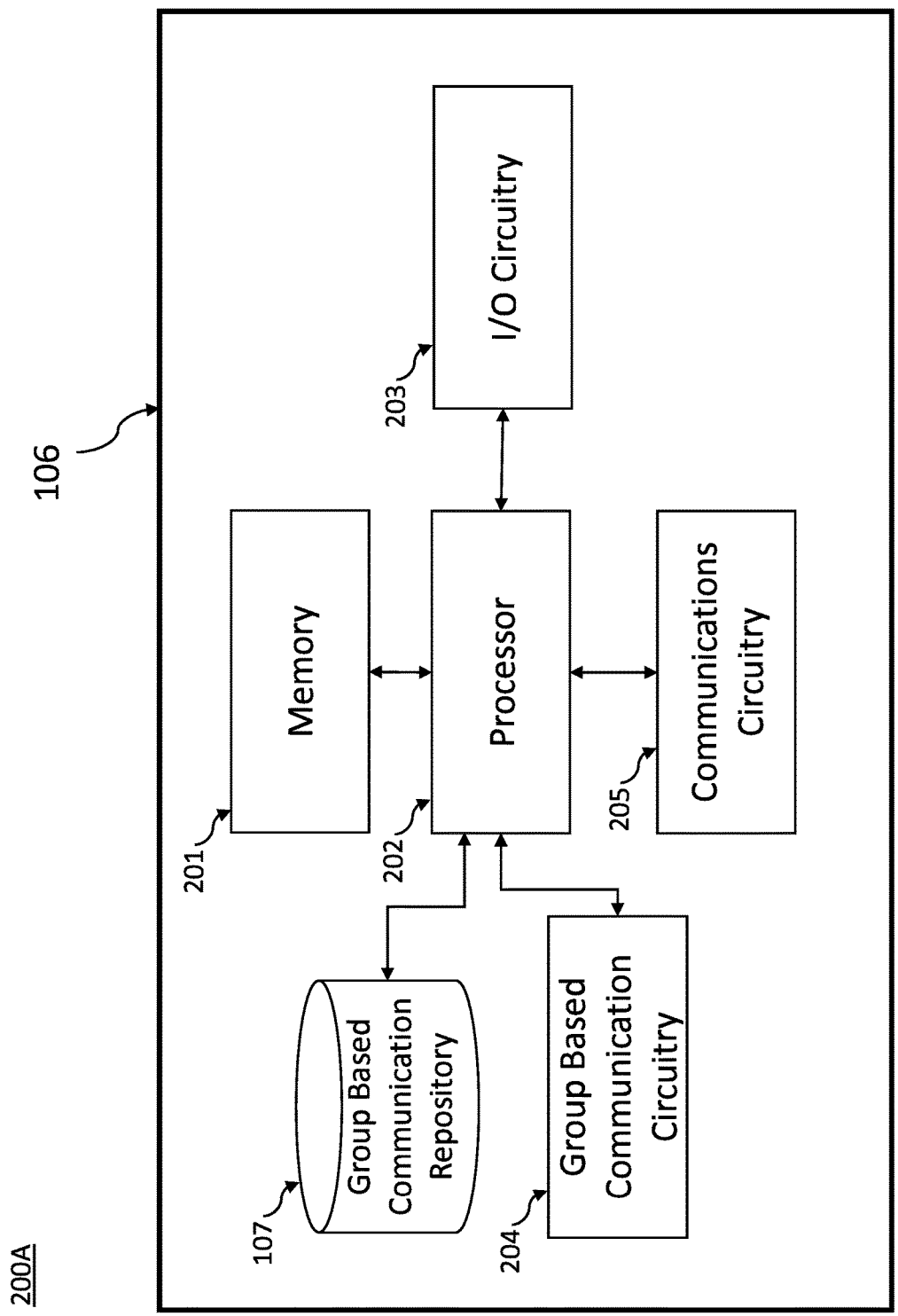
Figure 2B:
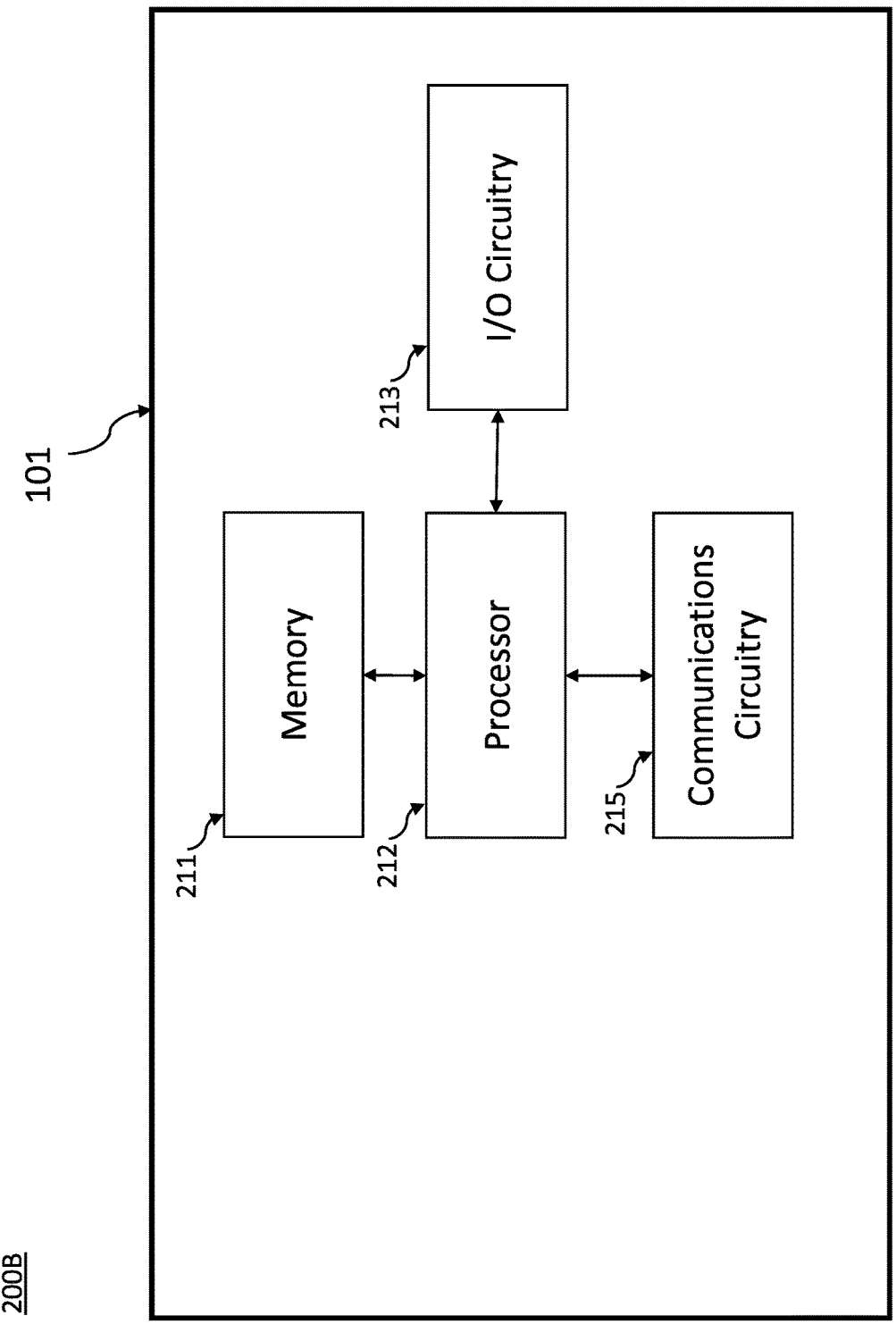

FIGS. 2A and 2B show exemplary apparatuses for implementing embodiments of the present invention.

Figure 3:
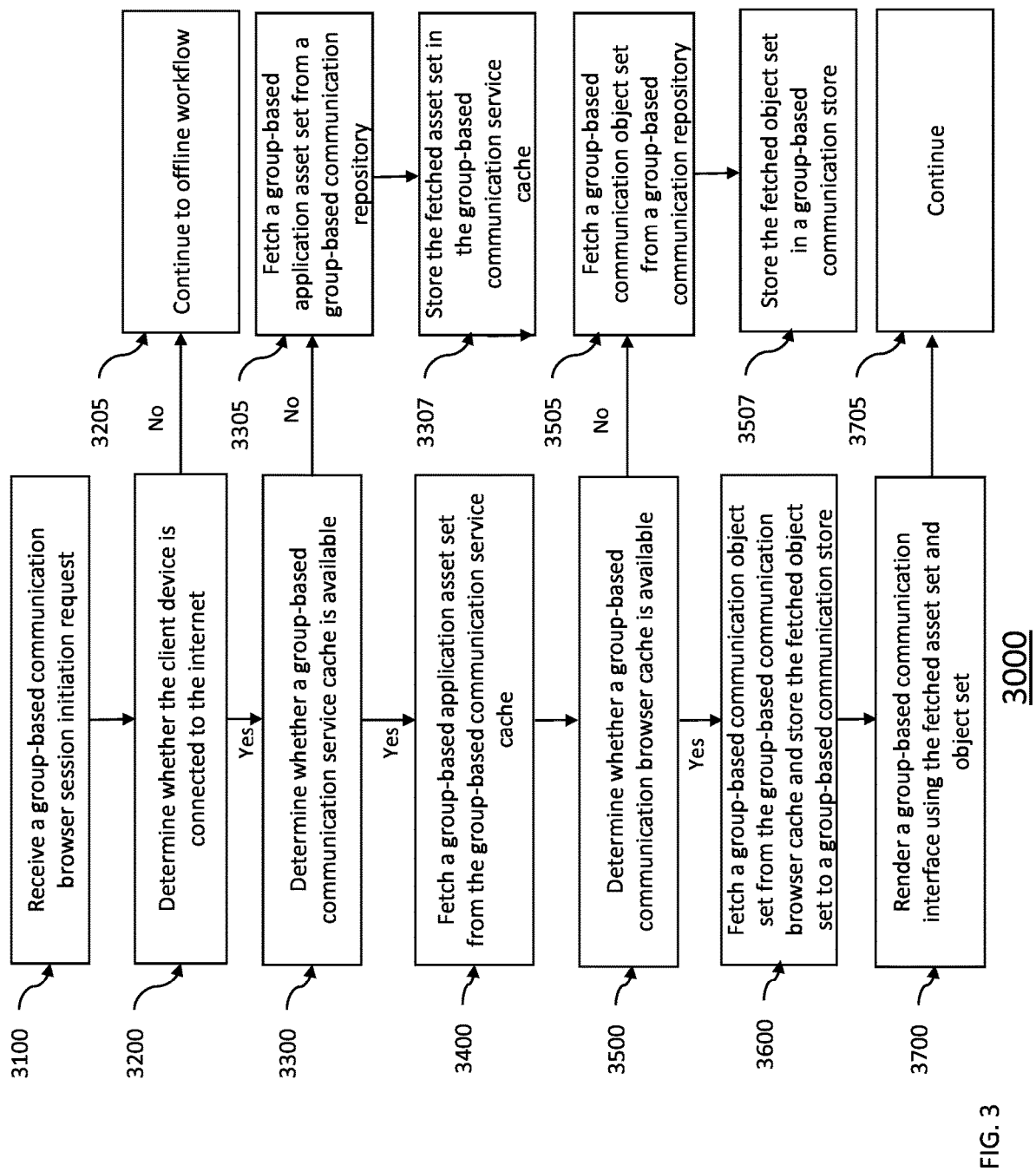

FIG. 3 shows a flow chart of an example method 3000, which is an overview for initiating a group-based communication browser session.

Figure 4:
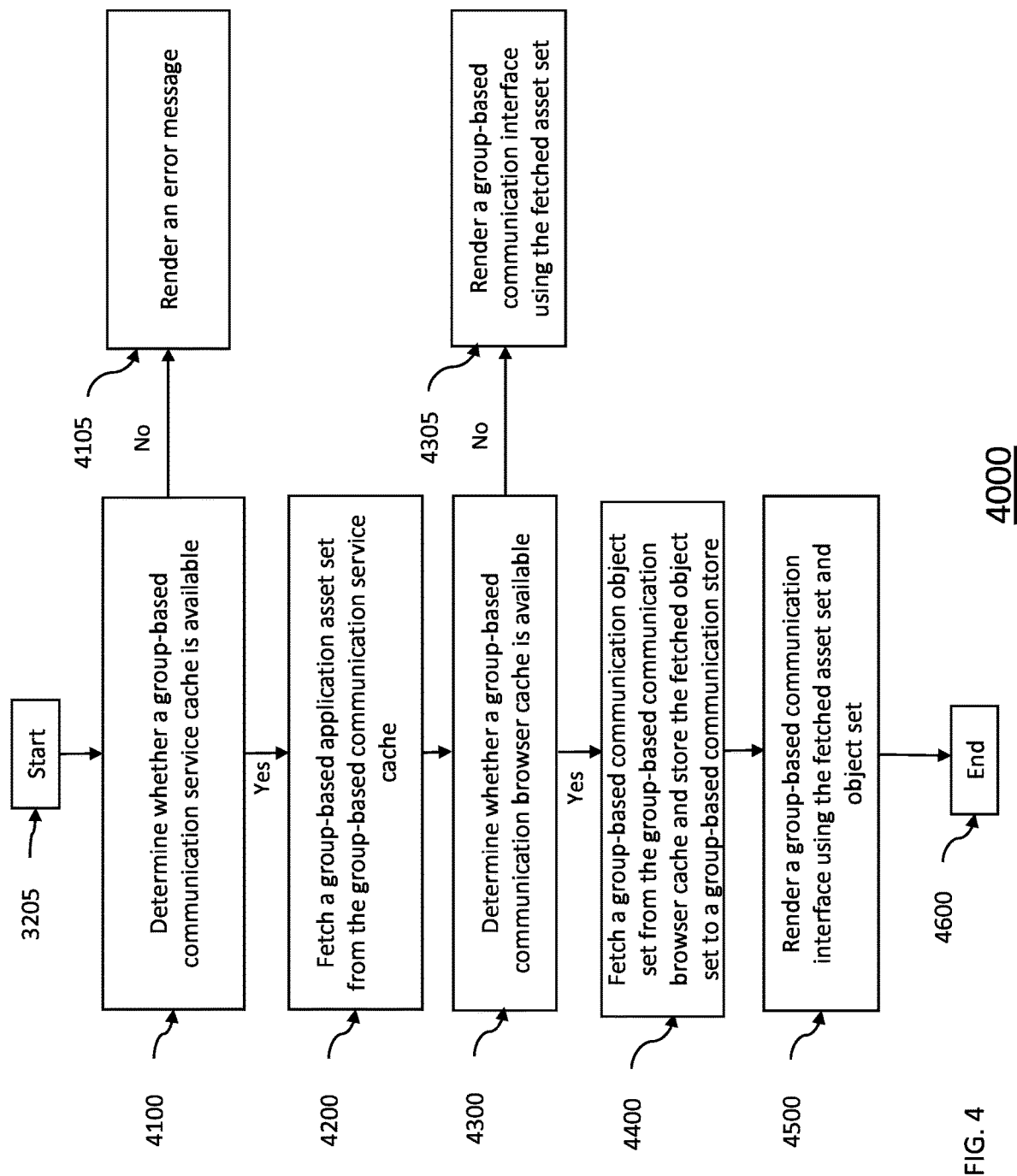

FIG. 4 shows a flowchart of an example method 4000 for initiating a group-based communication browser session when the client device is offline.

Figure 5:
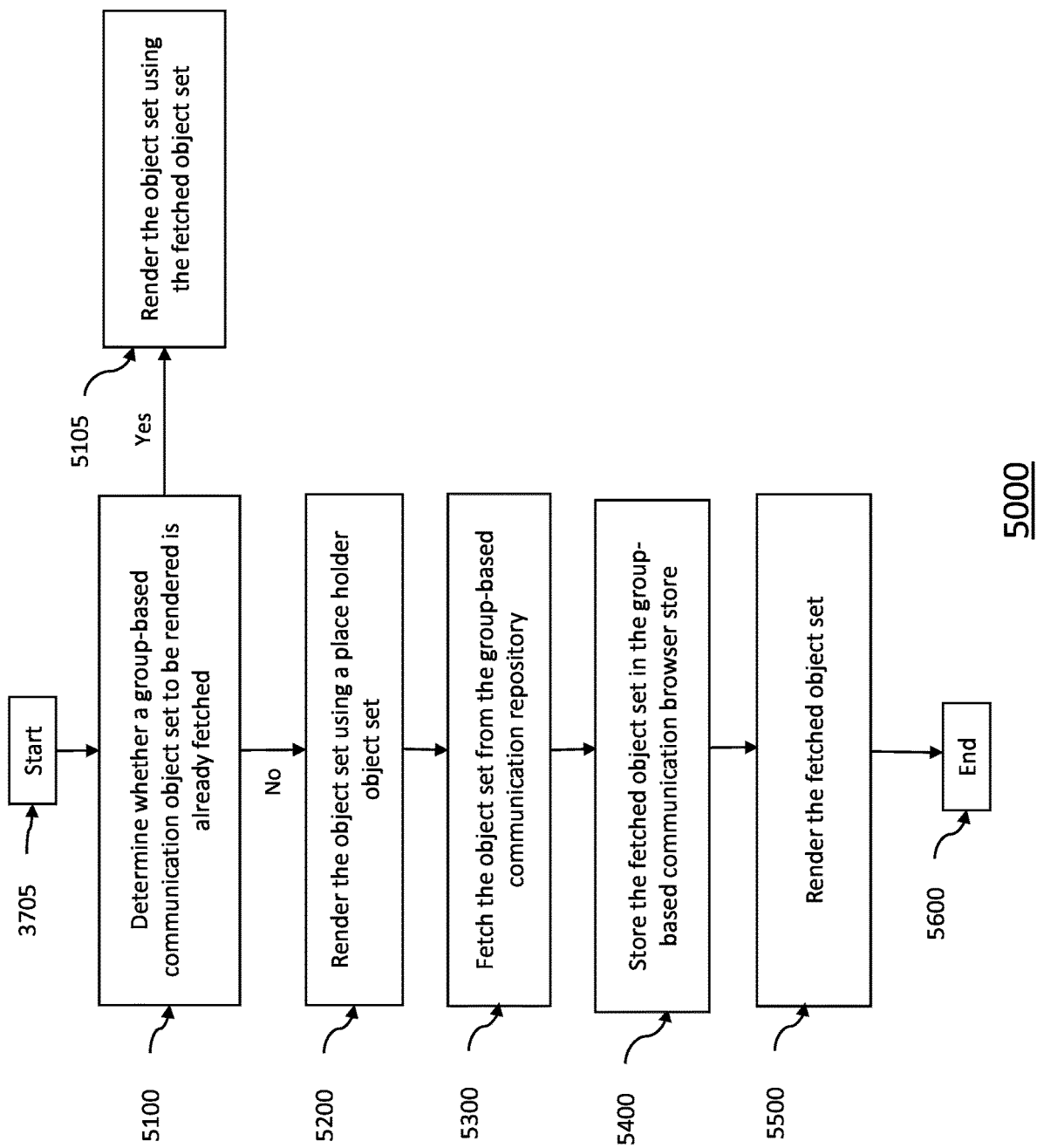

FIG. 5 shows a flowchart of an example method 5000 for rendering currently unavailable group-based communication objects in a group-based communication interface in a group-based communication browser session.

Figure 6:
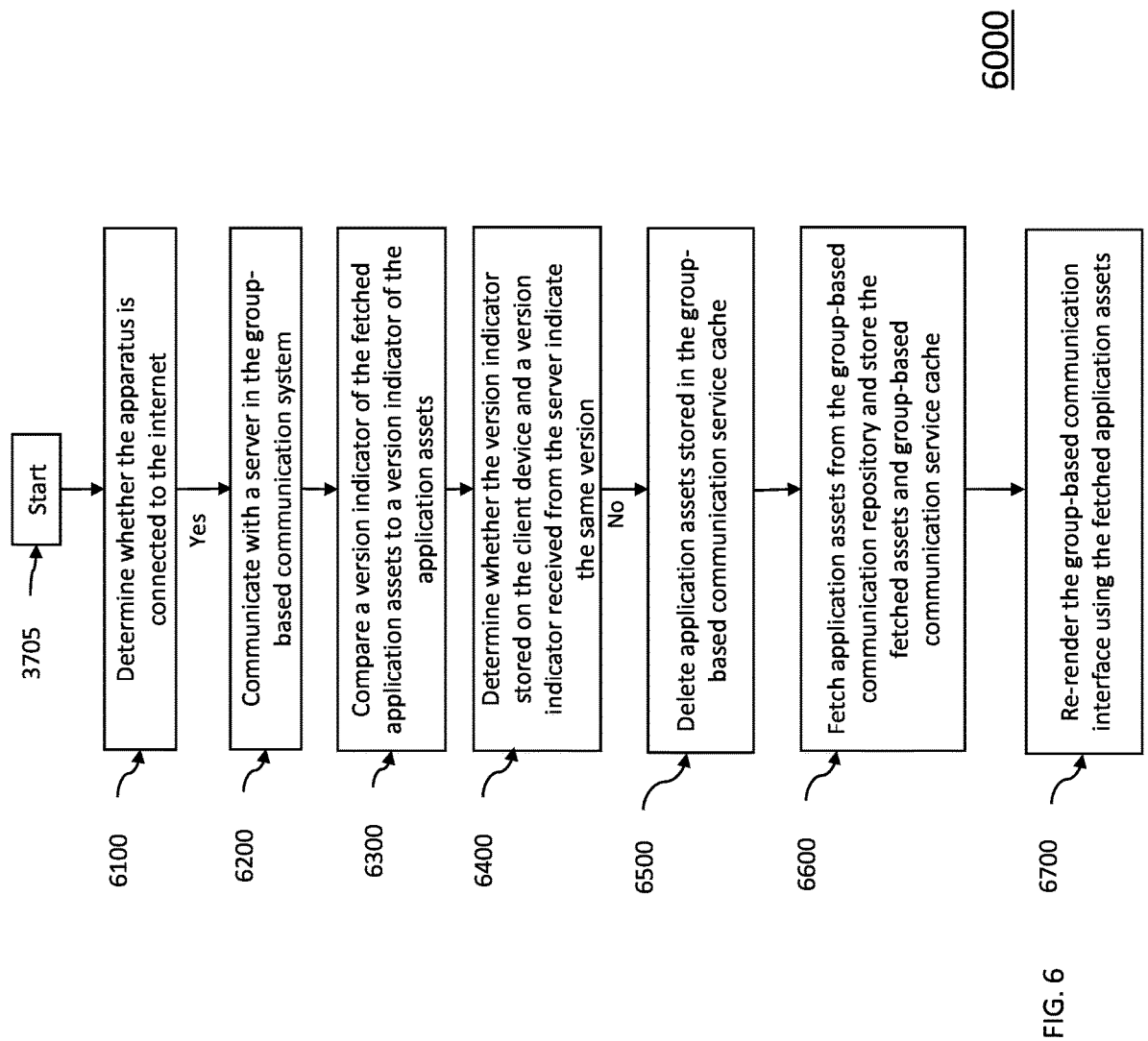

FIG. 6 shows a flowchart of an example method 6000 for checking version of group-based application assets in a group-based communication browser session.

Figure 7:
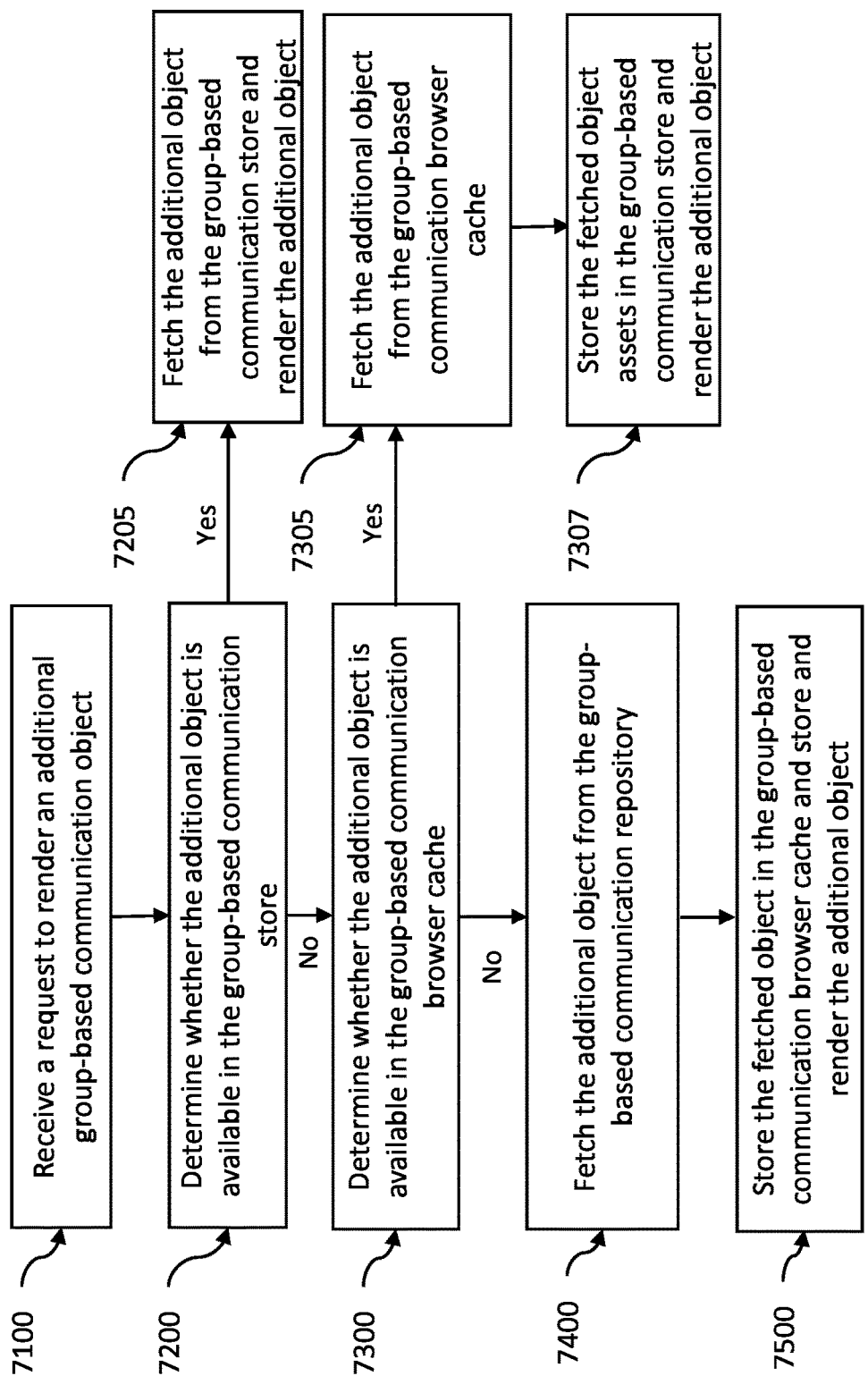

FIG. 7 shows a flowchart of an example method 7000 for fetching additional group-based communication objects in a group-based communication browser session.

Figure 8:
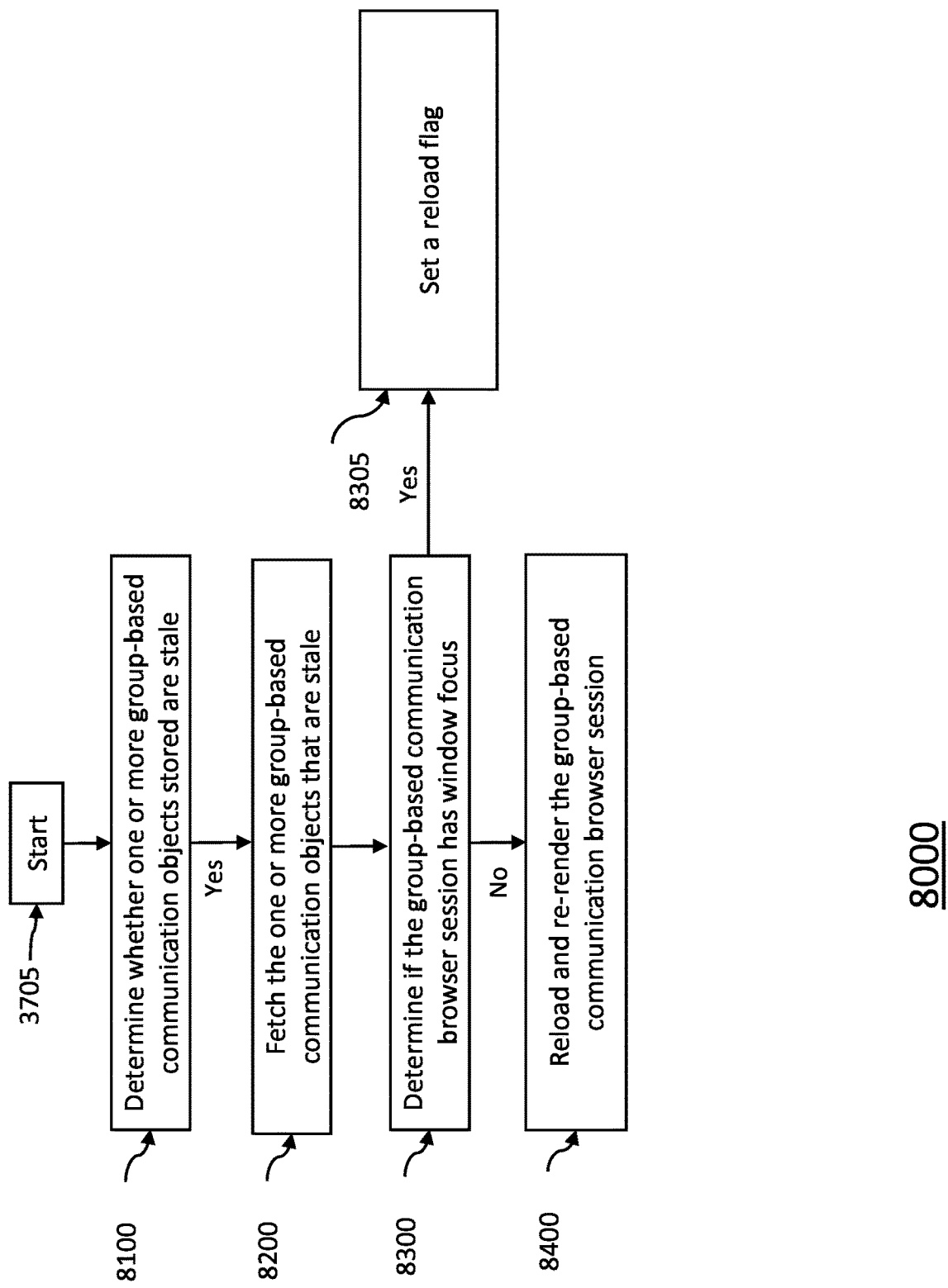

FIG. 8 shows a flowchart of an example method 8000 for updating a group-based communication object.

Figure 9:
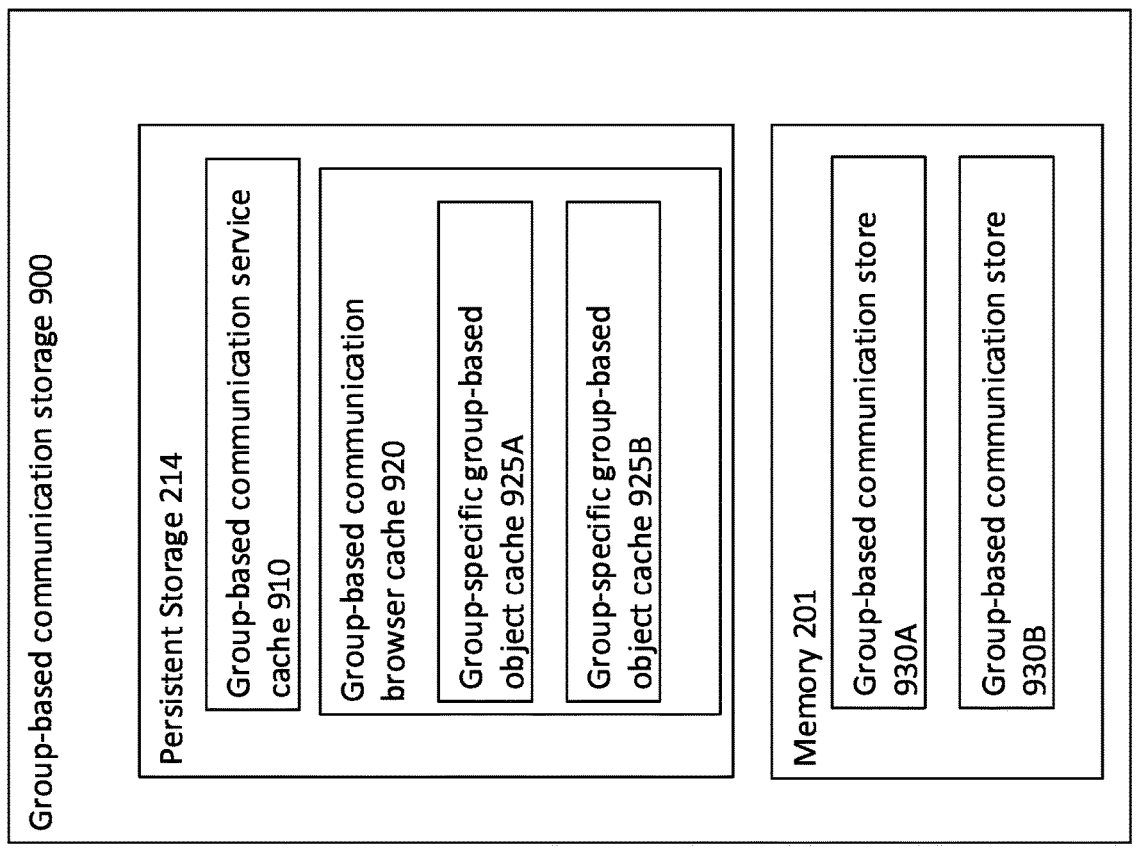

FIG. 9 shows a block diagram illustrating structure of an example memory 211 of a client device.

Figure 10:
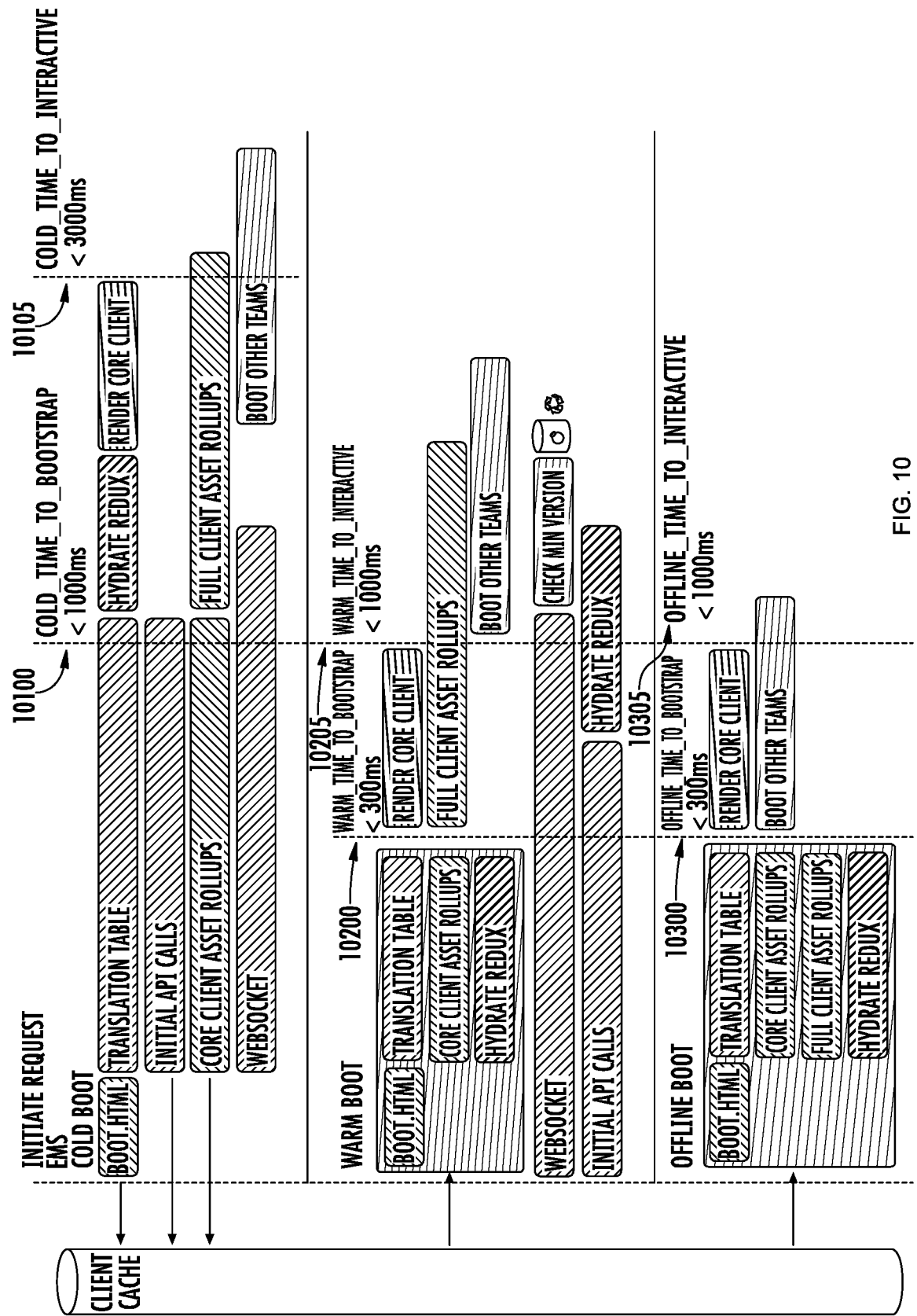

FIG. 10 shows a diagram illustrating performance metrics collected related to initiating a group-based communication browser session.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common group-based messaging communication set will be displayed to each member of the respective group-based communication channel such that the content of the group-based communication channel (i.e., messaging communications) will not vary per member of the group-based communication channel.

The term "user" should be understood to refer to an individual, group of individuals, business, organization, and the like; the users referred to herein are accessing a group-based communication or messaging system using client devices. Each user of the group-based communication system is associated with at least one group identifier. Each group identifier is a unique number. For example, in one embodiment, the group identifier may be stored as a 64 bit unsigned integer and represented externally (outside of memory) as a base-34 encoded string.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The terms "group-based communication channel identifier" or "channel identifier" refer to one or more items of data by which a group-based communication channel may be identified. For example, a group-based communication channel identifier may comprise ASCII ("American Standard Code for Information Interchange") text, a pointer, a memory address, and the like.

The terms "group identifier" or "team identifier" refer to one or more items of data by which a group within a group-based communication system may be identified. For example, a group identifier may comprise ASCII text, a pointer, a memory address, and the like.

As used herein, the terms "messaging communication" and "message" refer to any electronically generated digital content object provided by a user using a client device and that is configured for display within a group-based communication channel. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages).

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier may be used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "private group-based communication channel" refers to a group-based communication channel with restricted access such that it is not generally accessible and/or searchable by other members of the group-based communication system. For example, only those users or administrators who have knowledge of and permission to access (e.g., a group-based communication channel identifier for the private group-based communication channel is associated with their user profile after the user has been validated/authenticated) the private group-based communication channel may view content of the private group-based communication channel.

The term "group-based communication repository" refers to a location outside the client device where data is stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only.

As used herein, the term "third party application" refers to a software program, platform, or service that is accessible to or accessible through, or configured to perform functions within the group-based communication system. The third party application may be integrated in a group workspace (i.e., a group-based communication interface) within a group-based communication system via an app user. For example, a third party application may be a Software as a Service ("SaaS") product or an Application ("App") product that is provided by a third party application provider and which is stored and maintained by a third party application provider. In such an example, a client device accessing the group-based communication system may access the SaaS or App product via a group-based communication interface that a user of the client device is associated with.

As used herein, the term "third party application provider" refers to a provider of a third party application by way of a remote networked device, such as a server or processing device, maintained by a third party individual, company, or organization. A client device in a group-based communication system may access a third party application provided by the third party application provider to execute functions, flows, or actions. In some embodiments, the functions, flows, or actions produce an effect (e.g., an output, change, data modification, etc.) within the group-based communication system such as, for example, by manipulating data within the group-based communication system or posting messages within the group-based communication system, or executing some other action such as providing content to the group-based communication system for rendering in a group-based communication interface. In other embodiments, the functions, flows, or actions take effect within the third party application provider to produce an effect within the third party application provider. In yet other embodiments, the functions, flows, or actions produce effects within various combinations of the group-based communication system, the third party application provider, and other servers or systems.

As used herein, the term "third party application provider identifier" refers to one or more items of data by which a third party application provider that provides a third party application in a group-based communication system may be identified. For example a third party application provider identifier may comprise ASCII text, a pointer, a memory address, and the like.

As used herein, the term "third party application identifier" refers to one or more items of data by which a third party application within a group-based communication system may be identified. For example, a third party resource identifier may comprise ASCII text, a pointer, a memory address, and the like.

As used herein, the term "group-based communication object" refers to a collection of data and instructions that represent an item or resource of the group-based communication system. Each group-based communication object has an object identifier that uniquely identifies a particular group-based communication object in the group-based communication system and an object type, which describes the category of objects to which the group-based communication object belongs. In some embodiments, users may perform actions via a group-based communication interface that create or modify group-based communication objects. Example group-based communication objects include group-based communication channels, user profile identifiers, indications of user profiles (such as pointers with reference to user profiles), files created and maintained in the group-based communication system, files linked or uploaded to the group-based communication system, user accounts, emojis posted in a group-based communication channel, emojis available in a group-based communication channel, other group-based application assets, other group-based media assets, and the like. In some embodiments, metadata, such as a version indicator, may be associated with each group-based communication object.

As used herein, the term "group specific group-based communication object" refers to a collection of group specific data and instructions that represent group specific items or resources of the group-based communication system. Each group specific group-based communication object has an object identifier that uniquely identifies a particular group specific group-based communication object in the group-based communication system and an object type, which describes the category of objects to which the group specific group-based communication object belongs. In some embodiments, users may perform actions via a group-based communication interface that create or modify group specific group-based communication objects. Example group specific group-based communication objects include group-based communication channels definition data, group identifiers, indications of user profiles (such as pointers with reference to user profiles), files created and maintained in the group-based communication system, files linked or uploaded to the group-based communication system, emojis posted in a group-based communication channel, and the like.

As used herein, the term "group-based application asset" refers to a collection of non-group specific group-based communication objects. Group-based application asset can be used to render non-group specific components of a group-based communication interface. Example group-based application assets include webpage templates, web application script bundles, and non-group specific image assets.

As used herein, the term "group-based media asset" refers to a collection of image, document, and message data that are designated as media assets. Example group-based media assets may include image thumbnails for rendering group-based communication interfaces (e.g., interface layout related images and third party image icons), user avatars, custom emojis, and e-mail contents.

The term "group-based communication interface" refers to a virtual communications environment configured to facilitate user interaction with a group-based communications system. Each group-based communication interface is accessible and viewable to a select group of users (i.e., users that are associated with a selected group identifier), such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.).

As used herein, the term "workspace" refers to a group of users and a group-based communication object set all of which are associated with a common group identifier. Thus, users sharing a group identifier also share group-based communication objects. In other words, users sharing a common group identifier with a group-based communication object set may access those group-based communication objects to perform actions on those objects, such as viewing messages, posting messages, opening files, and the like. However, in some embodiments of a workspace, some group-based communication objects require that a group member have specific credentials or adequate permissions before the group-based communication object becomes accessible to the group member. As an example, private group-based communication channels are not generally accessible to all group members; instead, the private group-based communication channels are accessible to only a subset of group members. Similarly, certain files and other group-based communication objects, such as user accounts, are accessible to only a subset of the group members.

As used herein, the term "group-based communication browser session" refers to an information interchange session between a web browser installed on a client device and one or more data storage storing group-based communication objects. A group-based communication browser session is associated with a webpage in the web browser. The data storage storing group-based communication objects includes a group-based communication repository communicating with a client device via a server in the group-based communication system. The data storage storing group-based communication objects may include a local cache stored in a persistent local storage space of the client device, such as a group-based communication cache in the form of a group-based communication browser cache and/or a group-based communication service cache. In addition, a web browser installed on a client device may also communicate with a local storage engine stored in a memory of the client device, such as a group-based communication store, during a group-based communication browser session. A group-based communication browser session may support a web application, such as a JavaScript application. A group-based communication browser session may be associated with one, or multiple, group-based communication interfaces.

As used herein, the term "group-based communication service session" refers to a script capable of executing by a web browser installed on a client device supporting a browser session but separate from any webpage associated with a group-based communication browser session. A group-based communication service session may include a data storage (group-based communication service cache defined below) that supports a group-based communication browser session. A group-based communication service session may be configured to automatically fetch group-based application assets. In some embodiments, the group-based communication service session may be configured to fetch the group-based application assets on a periodic or triggered based basis. The group-based communication service session may also be configured to automatically update itself periodically.

As used herein, the term "group-based communication store" refers to a collection of data in a storage space in a non-persistent data storage of the client device storing group-based communication objects associated with a group-based communication browser session. A group-based communication store may be associated with a web application supported by a group-based communication browser session. In some example embodiments, the group-based communication store may be implemented using Redux provided via Massachusetts Institute of Technology license, in particular, a Redux store library in Redux.

As used herein, the term "group-based communication browser cache" refers to a collection of data in a storage space in a persistent data storage of the client device storing group-based communication objects associated with one or more group-based communication browser sessions. One group-based communication browser cache may be associated with multiple workspaces. Data stored in a group-based communication browser cache may be copied from a group-based communication store based on browser cache retention policy. Data stored in a group-based communication browser cache may be received from a group-based communication repository. In some example embodiments, the group-based communication browser cache may be implemented using Redux persist. In some embodiments using Redux persist, the group-based communication browser cache may include an authentication storage separate from Redux persist that is configured to store one or more of: an authentication API token, a user ID for active view in the last group-based communication browser session, an indication of locale (i.e., a language setting) associated with the group-based communication browser session.

As used herein, the term "group-based communication service cache" refers to a collection of data in a storage space in a persistent data storage of the client device storing group-based communication objects associated with one or more group-based communication service sessions. One group-based communication service cache may be associated with multiple workspaces. Data stored in group-based communication service cache may be copied from a group-based communication store based on service cache retention policy. In some example embodiments, the group-based communication cache may be implemented using off-the-shelf libraries such as Redux persist.

As used herein, the term "retention policy" refers to a rule set that define the conditions for retaining or evicting data and types of data to be retained or evicted under different conditions while copying data from one or more group-based communication stores to a group-based communication cache, such as a group-based communication browser cache or a group-based communication service cache. Separate retention policies may be used for group-based communication browser caches and group-based communication service caches.

As used herein, the term "hydration policy" refers to a rule set that define the conditions for fetching data and types of data to be fetched under different conditions when a client device is fetching data from a group-based communication cache or a group-based communication repository. Separate hydration policies may be used for group-based communication browser caches, group-based communication service caches, and group-based communication repository.

As used herein, the term "expiration policy" refers to a rule set that define the conditions for deleting and types of data to be deleted under different conditions for a group-based communication cache.

As used herein, the term "placeholder object" refers to an object configured to being rendered in place of one or more group-based communication objects when the one or more group-based communication objects are not available. A placeholder object may be rendered in a group-based communication browser session until the one or more group-based communication objects the placeholder object rendered in place of become available.

As used herein, the term "window focus" refers to an indicator associated with a user interface window running on a client device that indicates that the interface is currently viewable, active, or otherwise engageable via the display of the client device. For example, if the client device currently displays a window rendering a group-based communication interface on the foreground, the window rendering a group-based communication interface on the foreground has window focus. If the client device does not currently display the currently running window rendering a group-based communication interface, such as an instance where the currently running window rendering a group-based communication interface is demoted to the background, the window rendering a group-based communication interface does not have window focus.

Overview

Various embodiments of the present invention generally relate to a method and apparatus for initiating and executing a group-based communication browser session on a client device. Traditionally, a client device has to be connected to the Internet in order to initiate a group-based communication browser session rendering a group-based communication interface. A client device fetches data necessary to render the group-based communication interface from a group-based communication repository associated with a server in a group-based communication system, then renders the group-based communication interface based on the data fetched. Therefore, delays caused by network traffic are introduced in the process of receiving a group-based communication browser session initiation request and when rendering a group-based communication browser session. In addition, a client device cannot initiate a group-based communication browser session or render a group-based communication interface if the client device is not connected to the Internet, i.e., not connected to the group-based communication system.

On a separate note, traditionally, a group-based communication browser session is tied to a specific workspace. If a client device is rendering multiple group-based communication interfaces tied to multiple workspaces, the client device has to simultaneously run multiple group-based communication browser sessions. The multiple group-based communication browser sessions may separately load identical resources, such as non-group-specific group-based application assets supporting the interface. Therefore, executing multiple group-based communication browser sessions simultaneously and independently results in wasted computing resources, such as storage space, network usage, and computing power.

As a result of the inventions disclosed herein, a group-based communication browser session can start without a connection to the Internet and without being delayed because of network traffic; moreover, a group-based communication browser session can simultaneously support multiple group-based communication interfaces associated with multiple workspaces.

The group-based communication browser session, may start up by fetching group-based application assets stored in a local group-based communication service cache stored on a client device. In this manner, because there is no need to communicate with a server in the group-based communication system during startup of the group-based communication browser session, the startup time for a group-based communication browser session is not limited by network traffic anymore and can render a group-based communication interface almost instantly. The group-based communication browser session can render group-based communication objects currently unavailable using placeholder objects during start up, and fetch the unavailable object from a server in a group-based communication system later.

Moreover, the group-based application assets may be common assets not unique to a workspace. Therefore, a group-based communication browser session may support multiple workspaces without fetching the same asset set for multiple times.

Thus, the various embodiments disclosed provide for a more efficient group-based communication browser session that can start without the Internet and without being delayed because of network traffic; moreover, a group-based communication browser session can simultaneously support multiple group-based communication interfaces associated with multiple workspaces. Thus, the solutions provided in this disclosure may be employed to obtain a more efficient and improved group-based communication system.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present invention may operate. Users may access a group-based communication system 105 via a communications network 104 using client devices 101A-101N. The group-based communication system 105 may comprise a group-based communication server 106 in communication with at least one group-based communication repository 107.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedure call), JSON over REST ("Representational State Transfer")/HTTP ("HyperText Transfer Protocol"), and the like.

The group-based communication server 106 may be embodied as a computer or computers as known in the art. The group-based communication server 106 may provide for receiving of electronic data from various sources, including but not necessarily limited to the client devices 101A-101N. For example, the group-based communication server 106 may be operable to receive and post or transmit group-based messaging communications provided by the client devices 101A-101N.

The group-based communication repository 107 may be embodied as a data storage device such as a Network Attached Storage (NAS) device or devices, or as a separate database server or servers. The group-based communication repository 107 includes information accessed and stored by the group-based communication server 106 to facilitate the operations of the group-based communication system 105. For example, the group-based communication repository 107 may include, without limitation, a plurality of messaging communications organized among a plurality of group-based communication channels, and/or the like.

The client devices 101A-101N may be any computing device as defined above. Electronic data received by the group-based communication server 106 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smartphone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL          <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2    (KHTML,    like    Gecko)    Version/7.0    Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2    (KHTML,    like    Gecko)    Version/7.0    Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S Build/IMM76D)
AppleWebKit/534.30 (KHTML, like Gecko) Version/4.0 Mobile Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
```

```
      </client_details>
      <client_details> //Mac Desktop with Webbrowser
         <client_IP>10.0.0.123</client_IP>
         <user_agent_string>Mozilla/5.0  (Macintosh;  Intel  Mac  OS  X  10_9_3)
AppleWebKit/537.75.14 (KHTML, like Gecko) Version/7.0.3 Safari/537.75.14</user_agent_string>
         <client_product_type>MacPro5,1</client_product_type>
         <client_serial_number>YXXXXXXXXZ</client_serial_number>
         <client_UDID>FXXXXXXXXX-XXXX-XXXX-XXXX-
XXXXXXXXXXXXX</client_UDID>
         <client_OS>Mac OS X</client_OS>
         <client_OS_version>10.9.3</client_OS_version>
         <client_app_type>web browser</client_app_type>
         <client_name>Mobile Safari</client_name>
         <client_version>537.75.14</client_version>
      </client_details>
      <message>
         <message_identifier>ID_message_10</message_identifier>
         <team_identifier>ID_team_1</team_identifier>
         <channel_identifier>ID_channel_1</channel_identifier>
         <contents>That is an interesting invention. I have attached a copy our patent policy.</contents>
         <attachments>patent_policy.pdf</attachments>
      </message>
</auth_request>
```

The group-based communication system 105 comprises at least one group-based communication server 106 that may create a storage message based upon the received message to facilitate message indexing and storage in a group-based communication repository 107. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group-based communication server 106 may provide the following example storage message, substantially in the form of a HTTP(S) POST message including XML-formatted data, as provided below:

In embodiments, a group identifier as defined above may be associated with the message.

In embodiments, a group-based communication channel identifier as defined above may be associated with the message.

In embodiments, a sending user identifier as defined above may be associated with the message. In one implementation, the message may be parsed (e.g., using PHP—i.e. the script language derived from Personal Home Page Tools—commands) to determine a sending user identifier of the user who sent the message.

In embodiments, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

In embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

```
SELECT                            messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In embodiments, various metadata, determined as described above, and/or the contents of the message may be used to index the message (e.g., using the conversation primitive) to facilitate various facets of searching (i.e., search queries that return results from group-based communication repository 107). In one implementation, a storage message may be sent from group-based communication server 106 to facilitate indexing in group-based communication repository 107. In another implementation, metadata associated with the message may be determined and the message may be indexed in group-based communication repository 107. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 107 to facilitate searching. In one embodiment, the files may be indexed such that a company's or a group's files are indexed at a separate distributed repository.

Example Apparatus for Implementing Embodiments of the Present Disclosure

The group-based communication server 106 may be embodied by one or more computing systems, such as apparatus 200A shown in FIG. 2A. The apparatus 200A may include a processor 202, a memory 201, input/output circuitry 203, communications circuitry 205, group-based communication repository 107 and group-based communication circuitry 204. The apparatus 200A may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200A may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus 200A to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200A may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200A. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support a group-based communication system. The group-based communication circuitry 204 may utilize processing circuitry, such as the processor 202, to perform these actions. The group-based communication circuitry 204 may send and/or receive data from group-based communication repository 107. In some implementations, the sent and/or received data may be of enterprise-based digital content objects organized among a plurality of group-based communication channels. It should also be appreciated that, in some embodiments, the group-based communication circuitry 204 may include a separate processor, specially configured field programmable gate array (FPGA), or application specific interface circuit (ASIC).

The client device 101 may be embodied by one or more computing systems, such as apparatus 200B shown in FIG. 2B. The apparatus 200B may include a processor 212, a memory 211, input/output circuitry 213, communications circuitry 215, and persistent storage 214. The apparatus 200B may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200B may provide or supplement the functionality of particular circuitry. For example, the processor 212 may provide processing functionality, the memory 211 may provide storage functionality, the communications circuitry 215 may provide network interface functionality, and the like.

In some embodiments, the processor 212 (and/or co-processor or any other processing circuitry assisting or otherwise associated with the processor) may be in communication with the memory 211 via a bus for passing information among components of the apparatus. In other words, for example, the memory may be an electronic storage device (e.g., a computer readable storage medium). The memory 211 may be configured to store information, data, content, applications, instructions, or the like, for enabling the apparatus 200B to carry out various functions in accordance with example embodiments of the present disclosure.

The memory 211 may include a non-volatile computer-readable storage medium as a persistent storage such as a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

The memory 211 may also include a volatile computer-readable storage medium as a non-persistent storage such as a include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The processor 212 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 212 may be configured to execute instructions stored in the memory 211 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200B may include input/output circuitry 213 that may, in turn, be in communication with processor 212 to provide output to the user and, in some embodiments, to receive an indication of a user input. The input/output circuitry 213 may comprise a user interface and may include a display and may comprise a web user interface, a mobile application, a client device, a kiosk, or the like. In some embodiments, the input/output circuitry 213 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 211, and/or the like).

The communications circuitry 215 may be any means such as a device or circuitry embodied in either hardware or a combination of hardware and software that is configured to receive and/or transmit data from/to a network and/or any other device, circuitry, or module in communication with the apparatus 200B. In this regard, the communications circuitry 215 may include, for example, a network interface for enabling communications with a wired or wireless communication network. For example, the communications circuitry 215 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Initiating a Group-Based Communication Browser Session

FIG. 3 shows a flow chart of an example method 3000, which is an overview for initiating a group-based communication browser session in client device 101. Method 3000 is meant to show a high level example, while some of the other process flows discussed in relation to later figures show more detailed examples.

At 3100, the client device 101 is configured to receive a group-based communication browser session initiation request. The group-based communication browser session initiation request may be a user input requesting a group-based communication browser session transmitted via I/O circuitry 213. The user input requesting to initiate a group-based communication browser session may take the form of inputting a uniform resource locator (URL) address into a browser installed on the client device 101 and requesting to access the URL. In some embodiments, the URL address is associated with a specific work space, such as yourteam.slack.com/messages. In some alternative embodiments, the URL address is not associated with a specific workspace.

At 3200, the client device 101 is configured to determine whether the client device is connected to the Internet and connected to a server in the group-based communication system, such as server 106. The client device 101 may be connected to the Internet via communication circuitry 215. The client device 101 may determine whether the client device is connected to the Internet and connected to a server 106 in the group-based communication system by checking a connection status data reflecting Internet connection available on the client device. The client device 101 may also double check whether the client device is connected to the Internet and connected to a server 106 in the group-based communication system by sending a token to a server in the group-based communication system and check if a token is sent back. The client device 101 may also request API token from the server 106 upon determining that an API token is not available on the client device 101. In some embodiments, the API token may be a token associated with the client device and configured to be only readable by a server in the group-based communication system, such as server 106

If the client device 101 is determined to be connected to the Internet, the client device 101 is configured to proceed to 3300 and determine whether a group-based communication service cache is available. If the client device 101 is not determined to be connected to the Internet, the client device is configured to initiate offline workflow 3205. Offline workflow 3205 is described in more detail in conjunction with FIG. 4.

At 3300, the client device 101 is configured to determine whether a group-based communication service cache is available. Group-based communication service cache is a storage space in a persistent data storage of the client device 101 storing group-based communication objects associated with one or more group-based communication service sessions. One group-based communication service cache may be associated with multiple workspaces. Data stored in group-based communication service cache may be previously copied from a group-based communication store based on service cache retention policy. Data stored in group-based communication service cache may also be directly copied in the past from a group-based communication repository 107. In some example embodiments, the group-based communication cache may be implemented using Service Worker provided via the World Wide Web Consortium.

If the client device 101 determines that a group-based communication service cache is available, the client device 101 may proceed to 3400. If the client device 101 determines that a group-based communication service cache is not available, the client device 101 may proceed to 3305.

At 3305, the client device 101 is configured to fetch a group-based application asset set from the group-based communication repository 107. Group-based application asset is a collection of non-group specific group-based communication objects. Group-based application asset can be used to render non-group specific components of a group-based communication interface. Example group-based application assets include webpage templates, web application script bundles, and non-group specific image assets.

In some embodiments, the group-based application assets include a static HTML (Hypertext Markup Language) that contains a small amount of inlined JavaScript. The static HTML may be configured to initiate additional data fetches in the future upon user request or automatically and loads a web application script from a content delivery network. In some embodiments, the static HTML also include a feature flag set associated with other group-based communication objects. Additionally or alternatively, a feature flag set may be requested later at 3705. In some embodiments, the feature flags may be associated with specific group-based communication user profile, work space, or the like.

In some embodiments, the client device 101 may fetch the group-based application asset set from a group-based communication repository by sending a request to receive the group-based application asset set to a server 106 associated with the group-based communication repository in a group-based communication system 105. Upon receiving such a request, the server 106 may proceed to send the group-based application asset set to client device 101 via the Internet. Once the client device 101 receives the group-based application asset set from the server 106 in the group-based communication system 105, for example via I/O circuitry 213, the client device 101 may proceed to 3307 and store the fetched group-based application asset set in the group-based communication service cache. In some embodiments, the client device 101 may also store the fetched group-based application asset set in a group-based communication store or a group-based communication browser cache.

A group-based communication browser cache is a collection of data in a storage space of the client device in a persistent data storage, such as a persistent data storage as part of memory 211, storing group-based communication objects associated with one or more group-based communication browser sessions. One group-based communication browser cache may be associated with multiple workspaces. Data stored in a group-based communication browser cache may be copied from a group-based communication store based on a browser cache retention policy. Data stored in a group-based communication browser cache may be previously received from a group-based communication repository. The browser cache retention policy may define retaining a defined number of user profiles, a defined number of group-based channels, a defined number of group-based messages, a defined number of files and/or metadata associated with the files, and the like. In some example embodiments, the group-based communication browser cache may be implemented using Redux persist.

Group-based communication store is a storage space in a non-persistent data storage of the client device storing group-based communication objects associated with a group-based communication browser session. A group-based communication store may be associated with a web application supported by a group-based communication browser session. In some example embodiments, the group-based communication store may be implemented using a Redux store. After 3507, the client device 101 may proceed to 3700 and render a group-based communication interface using the previously fetched asset set and object set.

In some embodiments, at every instance where the client device 101 is requesting data from the server 106, the client device 101 will send a token for the server 106 to check the credential of the client device 101. In some embodiments, the token is a cookie dependent API token. The cookie dependent API token will only be accepted as valid by the server 106 if it is sent alongside a valid authentication cookie. Metadata regarding the authentication cookie may be stored as a bundle with the cookie dependent API token by the server 106 and the cookie dependent API token will be accepted as valid on if the cookie dependent API token is received with the authentication cookie associated with the cookie dependent API token.

In some embodiments, the authentication cookie may be stored on the client device 101 and access to the authentication cookie may be restricted, such as restricted from web application scripts like JavaScripts. In some embodiments, the token is an API token stored locally in the client device 101 in an authentication storage in the group-based communication browser cache.

After 3307, the client device 101 may proceed to 3700 and render a group-based communication interface using the previously fetched assets and objects. In some embodiments, the client device 101 is also configured to, in addition to fetching the group-based application assets, make an API (application platform interface) call to the group-based communication server 106.

A module associated with the group-based communication browser session and, such as a React component in Redux, may dispatch a message requesting group-based communication objects, are provided below:

```
class MessageSendButton extends React.Component {
    onClick( ) {
        const action = sendMessage(this.props.messageText,
        this.props.activeChannel)
        dispatch(action).then(( ) => {
            this.setState({
                isSending: false,
                messageText: '',
            });
        });
    }
}
```

The message may be intercepted by another module associated with the group-based communication browser session, such as a socket manager Middleware in Redux, to send the message to the group-based communication server 106. An example implementation is provided below:

```
const socketManagerMiddleware = store => next => (action) => {
    const state = store.getState( );
    const teamId = getTeamId(state);
    switch (action.type) {
    case sendMessage.getType( ): {
        return socketManagers[teamId].send(action.payload);
    }
}
```

The Middleware looks up the socket manager instance for a team ID associated with a group that the action was dispatched on and passes the payload through, returning the a token indicating that socket manager's send action for the React component to use.

At 3400, the client device 101 is configured to fetch a group-based application asset set from the group-based communication service cache. The scope of the group-based application asset set fetched may be dependent on a predefined group-based communication service cache hydration policy. For example, the group-based communication service cache hydration policy may define that all group-based application assets related to rendering of a group-based communication interface will be fetched at 3400. In some embodiments, at 3400, the client device 101 is also configured to fetch a group-based media asset set from the group-based communication service cache. Group-based media asset is a collection of image, document, and message data that are designated as media assets. Example group-based media asset may include image thumbnails for rendering group-based communication interfaces (e.g., interface layout related images and third party image icons), user avatars, custom emojis, and e-mail contents.

At 3500, the client device 101 is configured to determine whether a group-based communication browser cache is available. If the client device 101 determines that a group-based communication browser cache is available, the client device 101 may proceed to 3600. If the client device 101 determines that a group-based communication browser cache is not available, the client device 101 may proceed to 3505.

At 3505, upon determining that a group-based communication browser cache is not available, the client device 101 is configured to fetch a group-based communication object set from the group-based communication repository 107. The client device 101 may fetch the group-based communication object set from the group-based communication repository 107 based on a group-based communication repository hydration policy. The group-based communication repository hydration policy is a rule set that define the conditions for fetching data and types of data to be fetched under different conditions when the client device is fetching data from a group-based communication repository. Example group-based communication objects fetched may include a defined number of user profiles, a defined number of group-based channels, a defined number of group-based messages, a defined number of files, and the like. The defined number may be defined on a per workspace basis. In some embodiments, hydration policies may prioritize group-based communication objects most recently utilized by another client device associated with the same user profile that client device 101 is associated. Metadata indicating utilization related to a specific user profile of the group-based communication objects may be stored on the group-based communication repository 107. In some embodiments, group-based communication repository hydration policy may also indicate that non-group-based message data will be hydrated at 3505 while group-based messages may be hydrated after 3705.

At 3507, upon fetching the group-based communication object set from a group-based communication repository 107, the client device 101 may be configured to store the fetched object set in a group-based communication store.

In some embodiments, the client device 101 may also store the fetched object set in a group-based communication browser cache under a group-based communication browser cache retention policy. Group-based communication browser cache retention policy is a rule set that define the conditions for retaining or evicting data and types of data to be retained or evicted under different conditions while copying data from one or more group-based communication stores to a group-based communication browser cache. Group-based communication browser cache retention policies may include policies defining group-based communication objects to be ignored while storing group-based communication objects to a group-based communication cache.

Group-based communication browser cache retention policies may also include policies defining group-based communication objects to be retained while storing group-based communication objects to a group-based communication cache. In some embodiments, example group-based communication objects to be retained include a defined number of users, group-based communication objects defining a defined number of channels, a defined number of group-based messages, a defined number of files, and the like. In some embodiments, group-based communication browser cache retention policies will define group-based communication objects to be retained based on type of elements on the group-based communication interface that the group-based communication objects are associated with. For example, separate retention policies may be defined for group-based communication objects associated with rendering of a group-based communication channel, a group-based communication user, and the like.

At 3600, upon determining that a group-based communication browser cache is available, the client device 101 is configured to fetch a group-based communication object set from the group-based communication browser cache and store the fetched object set to a group-based communication store. The client device 101 may fetch the group-based communication object set from the group-based communication browser cache based on a group-based communication browser cache hydration policy.

The group-based communication browser cache hydration policy is a rule set that define the conditions for fetching data and types of data to be fetched under different conditions when the client device is fetching data from a group-based communication browser cache. Example group-based communication objects fetched may include a defined number of user profiles, a defined number of group-based channels, a defined number of group-based messages, a defined number of files and/or metadata associated with the files, and the like. The defined number may be defined on a per workspace basis. In some embodiments, hydration policies may prioritize group-based communication objects most recently utilized by another client device associated with the same user profile that client device 101 is associated with. Metadata indicating utilization related to a specific user profile of the group-based communication objects may be stored on the group-based communication browser cache. In some embodiments, group-based communication browser cache hydration policy may also indicate that non-group-based message data will be hydrated at 3600 while group-based messages may be hydrated after 3705.

At 3700, the client device 101 is configured to render a group-based communication interface using all of the previously fetched assets and objects. In some embodiments, after rendering the group-based communication interface, the client device 101 will proceed to 3705 and continues communication with a server, such as the server 106 in the group-based communication system 105. The client device 101 may fetch additional group-based communication objects and application assets.

In some embodiments, the client device 101 is also configured to, at 3705, make an API (application platform interface) call to the group-based communication server 106. In some embodiments, the API call may include a users.count API call that requests metadata group-based communication objects associated with group-based communication user profiles, such as a list of unread group-based messages, a frequency or number of instances where the username of a selected user appears in the group-based communication messages, and other metadata associated with the workspace. In some embodiments, the API call may also include a conversations.view API call that requests which requests group-based communication objects associated with group-based messages may be initiated. In some embodiments, the data requested in the API calls may be utilized to render a flexpane in a group-based communication interface.

A module associated with the group-based communication browser session, such as a React component, may dispatch a message requesting group-based communication objects, are provided below:

```
class MessageSendButton extends React.Component {
    onClick( ) {
        const action = sendMessage(this.props.messageText,
        this.props.activeChannel)
        dispatch(action).then(( ) => {
            this.setState({
                isSending: false,
                messageText: '',
            });
        });
    }
}
```

The message may be intercepted by another module associated with the group-based communication browser session, such as a socket manager Middleware in Redux, to send the message to the group-based communication server 106. An example implementation is provided below:

```
const socketManagerMiddleware = store => next => (action) => {
    const state = store.getState( );
    const teamId = getTeamId(state);
    switch (action.type) {
    case sendMessage.getType( ): {
        return socketManagers[teamId].send(action.payload);
    }
}
```

The middleware looks up the socket manager instance for a team ID associated with a group that the action was dispatched on and passes the payload through, returning the a token indicating that socket manager's send action for the React component to use.

Additional workflow related to 3705 will be described in more detail in conjunction with FIG. 5, FIG. 6, and FIG. 7.

Offline Workflow

FIG. 4 shows a flowchart of an example method 4000 for initiating a group-based communication browser session. The example method 4000 may be continued from 3205 in FIG. 3 upon determining that the client device 101 is offline. At 4100, the client device 101 is configured to determine whether a group-based communication service cache is available. At 4105, if a group-based communication service cache is not available, the client device 101 may proceed to render an error message.

At 4200, if a group-based communication service cache is available, the client device 101 is configured to fetch a group-based application asset set from the group-based communication service cache. In some embodiments, at 4200, the client device 101 is also configured to fetch a group-based media asset set from the group-based communication service cache.

After fetching the group-based application asset set, at 4300, the client device 101 is configured to determine whether a group-based communication browser cache is available. If a group-based communication browser cache is not available, the client device 101 is configured to proceed to render a group-based communication interface using the previously fetched application asset set and media asset set at 4305. In this regard, the group-based communication interface rendered will include a framework of a group-based communication interface but may render an object set unavailable in the framework using a placeholder object set.

In some embodiments, the group-based communication interface may further include a message indicating that the client device 101 must be connected to the Internet to render additional group-based communication objects. Placeholder object is an object configured to being rendered in place of one or more group-based communication objects when the one or more group-based communication objects are not available. A placeholder object may be rendered in a group-based communication browser session until the one or more group-based communication objects the placeholder object rendered in place of become available, such as by establishing a communication with server 106 and fetching the group-based communication objects.

If a group-based communication browser cache is available, at 4400, the client device 101 is configured to fetch a group-based communication object set from the group-based communication browser cache and store the fetched object set to a group-based communication store. After fetching the group-based communication object set, at 4500, the client device 101 is configured to render a group-based communication interface using the previously fetched asset set and object set. In this regard the group-based communication interface rendered will include a framework of a group-based communication interface and a number of other group-based communication objects, such as user profiles, group-based channels, group-based messages, and the like.

Unknown Objects

FIG. 5 shows a flowchart of an example method 5000 for rendering currently unavailable group-based communication objects in a group-based communication interface in a group-based communication browser session. For example, during the course of a group-based communication browser session, a user operating a client device 101 may request to view one or more group-based communication objects not currently available in the group-based communication browser session, such as one or more additional group-based messages, a file, and the like. Upon receiving such a request, the client device 101 is configured to, at 5100, determine whether the group-based communication object set to be rendered based on the user request are already fetched in the previous steps. In another example, the client device 101 may render a group-based communication interface in accordance with a defined framework and some defined group-based communication objects in the defined framework may not be rendered in 3700.

Upon detecting that the group-based communication object set is already fetched, the client device 101 is configured to, at 5105, render the previously fetched group-based communication objects requested. For example, a client device 101 may already fetched a number of messages and files from a group-based communication service cache or group-based communication browser cache. In some embodiments, even though the messages and files are not rendered at the initial stage (e.g., 3700), the fetched messages and files are stored in a non-persistent storage of client device 101 and could be rendered by client device 101 without checking a group-based communication cache upon receiving such a request.

Upon detecting that the group-based communication object set is not already fetched, the client device 101 is configured to, at 5200, render the group-based communication object set using placeholder object set. Placeholder objects are objects configured to being rendered in place of one or more group-based communication objects when the one or more group-based communication objects are not available. A placeholder object may be rendered in a group-based communication browser session until the one or more group-based communication objects the placeholder object rendered in place of become available.

In some embodiments, the client device 101 may determine whether an object needs to be rendered in place of the placeholder object. If the client device 101 determined that no object needs to be rendered in place of the placeholder object (i.e., an error case), the client device 101 may stop rendering the placeholder object. If the client device 101 determined that an object needs to be rendered in place of the placeholder object, the client device 101 may proceed to 5300.

At 5300, the client device 101 is configured to fetch the group-based communication object set previously requested from the group-based communication repository 107. The client device 101 may be configured to fetch the group-based communication object set previously requested from the group-based communication repository 107 by communicating with server 106 in the group-based communication system 105. Upon receiving such a request, the server 106 may send the group-based communication object set to client device 101. In some embodiments, the client device 101 makes such a request in the form of API calls. In some embodiments, instead of directly fetching the group-based communication objects from the group-based communication repository 107, the client device 101 may attempt to fetch the group-based communication object set from local group-base communication caches first, such as group-based communication browser cache and group-based communication browser cache, as described in conjunction with FIG. 7.

At 5400, the client device 101 is configured to store the fetched group-based communication object set in the group-based communication browser cache. At 5500, the client device 101 is configured to render the previously fetched group-based communication object set in the place of the placeholder object set. In some embodiments, the client device 101 is also configured to store the fetched group-based communication object set in the group-based communication browser cache.

Min-Version Bump

FIG. 6 shows a flowchart of an example method 6000 for checking version of group-based application assets in a group-based communication browser session. The process of checking version of group-based application assets and updating group-based application assets may be referred to as a Min-Version bump. In some embodiments, the method 6000 may be part of or after 3705. Although the operations in FIG. 6 is described with regard to group-based application assets, similar techniques may be applied to other group-based application objects.

At 6100, the client device 101 is configured to determine whether the client device is connected to a group-based communication server 106, e.g., via the Internet. Upon determining that the client device 101 is connected to the group-based communication server 106, the client device 101 is configured to, at 6200, to communicate with the group-based communication server 106 by sending a token indicating a request to check group-based application assets version. In some embodiments, the token may comprise a version indicator indicating the version of application assets on the client device 101. Alternatively, the token may be sent without such a version indicator. In some embodiments, the version indicator may be stored as metadata associated with the group-based application assets. In some embodiments, the version indicator is a timestamp metadata.

Upon receiving the request to check application assets version, the server 106 may send a version indicator of the most recent version of group-based application assets stored in the group-based communication repository 107 to the client device 101. After the client device 101 receives the version indicator of the most recent version of group-based application assets from the server 106, the client device is configured to compare, at 6300, the received version indicator to the version indicator of the previously fetched group-based application assets. The version indicator may be a version indicator for group-based application assets as a whole or version indicators for different sub-sets of the group-based application assets.

At 6400, the client device 101 is configured to determine whether the version indicator previously stored on the client device and the version indicator received from the server 106 indicate the same version of group-based application assets. If the indicator previously stored on the client device and the version indicator received from the server indicate the same version of the group-based application assets, the group-based application assets previously fetched and rendered by client device 101 is up to date. Therefore, the client device will not need to update the previously fetched group-based application assets.

If indicator previously stored on the client device and the version indicator received from the server do not indicate the same version of the group-based application assets, the group-based application assets previously fetched and rendered by client device 101 is not up to date. Thereafter, the client device is configured to, at 6500, to delete the group-based application assets stored in the group-based communication service cache.

In some embodiments, instead of deleting the entire set of group-based application assets stored in the group-based communication service cache, the client device 101 may selectively delete a subset of group-based application assets that are not the same version as the group-based application assets stored in the group-based communication repository 107. For example, the group-based application assets stored on the group-based communication repository 107 may be a version dated 2018 May 5. Group-based application assets on the client device may include HTML templates version dated 2018 May 5 and web application scripts version dated 2018 Mar. 7. As such, the client device will delete the web application scripts but not the HTML templates.

After deleting group-based application assets from the group-based communication service cache, the client device 101 is configured to, at 6600, fetch group-based application assets from the group-based communication repository 107 and store the fetched group-based application assets in group-based communication service cache. Therefore, the client device 101 replaces the group-based application assets stored in the service cache with group-based application assets fetched from the group-based communication repository 107. The group-based application assets can be used to initiate a group-based communication browser session in the future. In some embodiments, the group-based application assets is "one reload behind", which means that the group-based application assets stored in the group-based communication service cache is up to date to the date that the client device lastly start the group-based communication browser session.

At optional operation 6700, the client device 101 is configured to re-render the group-based communication interface using the application assets fetched from the group-based communication repository 107. In some embodiments, instead of immediately re-rendering the group-based communication interface, the client device 101 will determine the type of group-based application assets replaced beforehand. If the type of group-based application assets replaced is critical, such as a webpage templates or web application script bundles, the client device 101 will re-render the group-based communication interface.

In some embodiments, operations 8300, 8305 and 8400 described in conjunction with FIG. 8 may be used to perform optional operation 6700.

Fetching Additional Objects

FIG. 7 shows a flowchart of an example method 7000 for fetching additional group-based communication objects in a group-based communication browser session for a client device 101. In some embodiments, the operations described in conjunction with FIG. 7 can be used to replace operation 5300 and 5400 described in conjunction with FIG. 5. In some embodiments, method 7000 can replace other operations related to fetching additional group-based communication objects, such as operation 8200 described in conjunction with FIG. 8.

At 7100, the client device 101 is configured to receive a request to render an additional group-based communication object. In some embodiments, operation 7100 can be replaced by other operations which results in generation an indication that fetching of an additional object is required, such as operation 8100.

At 7200, the client device 101 is configured to determine whether the additional group-based communication object is available in the group-based communication store. If the additional group-based communication object is available in the group-based communication store, the client device 101 is configured to, at 7205, fetch the additional group-based communication object from the group-based communication store and render the additional group-based communication object.

If the additional group-based communication object is not available in the group-based communication store, the client device 101 is configured to, at 7300, determine whether the additional group-based communication object is available in the group-based communication browser cache. If the additional group-based communication object is available in the group-based communication browser cache, the client device is configured to, at 7305, fetch the additional group-based communication object from the group-based communication browser cache and render the additional group-based communication object.

If the additional group-based communication object is not available in the group-based communication browser cache, the client device is configured to, at 7400, fetch the additional group-based communication object from the group-based communication repository 107. At 7500, the client device is configured to store the fetched additional group-based communication object in the group-based communication browser cache and the group-based communication store and render the additional group-based communication object.

Automatically Updating Objects

FIG. 8 shows a flowchart of an example method 8000 for updating a group-based communication object. In some embodiments, the method 8000 may be part of or after 3705.

At 8100, the client device 101 is configured to determine whether one or more group-based communication objects currently rendered or otherwise stored on the client device 101, such as one or more group-based communication objects stored in the group-based communication store or browser cache, are stale.

In some embodiments, the client device 101 may preliminarily screen whether one or more group-based communication objects stored are potentially stale by checking an indication of when the group-based communication objects is fetched, such as a timestamp, a connection count indicating total number of connections to group-based communication system 105 made before initiating a session associated with fetching the group-based communication object, or the like. Once a group-based communication object is determined to be potentially stale, the client device 101 may determine whether the group-based communication object is stale by querying a server in the group-based communication system 105, such as server 107, of a version indicator of the group-based communication object. In some embodiments, operation 8100 may replace operation 7100 in FIG. 7.

If the client device 101 determines that one or more group-based communication objects stored on the client device 101 are stale, the client device 101 is configured to, at operation 8200, fetch the one or more group-based communication objects that are stale from the group-based communication repository 107.

After the client device 101 fetch the one or more group-based communication objects that are stale, the client device 101 is configured to, at operation 8300, determine if the group-based communication browser session has window focus. In some embodiments, the client device 101 may be configured to perform operation 8300 under other defined conditions separate from operation 8200, such as periodically. Window focus is a data structure on a client device that indicates if a particular currently running window is currently viewable, active, or otherwise engageable via the display of the client device. For example, if the client device currently displays a window rendering a group-based communication interface on the foreground, the window rendering a group-based communication interface on the foreground has window focus. If the client device does not currently display the currently running window rendering a group-based communication interface, such as an instance where the currently running window rendering a group-based communication interface is in the background, the window rendering a group-based communication interface does not have window focus. In some embodiments, a window rendering the group-based communication interface is determined to have window focus only if the window is the foremost window rendered on the display of the client device.

If the client device 101 determines that the group-based communication browser session does not have window focus, the client device 101 is configured to, at operation

8400, reload the group-based communication browser session to re-render the group-based communication.

If the client device 101 determines that the group-based communication browser session does have window focus, the client device 101 is configured to, at operation 8305, set a reload flag which indicate that the client device 101 will reload and re-render the group-based communication interface as soon as the group-based communication interface loses window focus.

Memory Structure

FIG. 9 shows a block diagram illustrating structure of an example memory 211 of a client device. Memory 211 comprises persistent storage 902 and non-persistent storage 904. In some embodiments, group-based communication service 910 and group-based communication browser cache 920 reside on persistent storage 902. The group-based communication browser cache 920 may include different group-specific group-based communication object cache 925A and 925B associated with different workspaces. In some embodiments, group-based communication store 930 resides on non-persistent storage 904. Group-based communication store 930 may be divided into 930A and 930B which are group-specific group-based communication store and non-group specific group-based communication stores.

Monitoring Performance Metrics

In some embodiments, the client device 101 is configured to collect performance metrics during the course of initiating a group-based communication browser session, such as during the operations described in conjunction with FIG. 3 to FIG. 8. The client device 101 may send the collected performance metrics to group-based communication server 106.

In some embodiments, example performance metrics include initialization related metrics such as times to first render under different situations such as online or offline, group-based communication service cache available or not available, times to usable or first meaningful paint under different situations such as online or offline, group-based communication service cache available or not available, whether the current group-based communication browser session initiated with group-based application assets stored in a group-based communication service cache, percentage of group-based communication browser sessions initiated with group-based application assets stored in a group-based communication service cache, and the like. In some embodiments, example performance metrics include error related metrics such as group-based communication browser session load failure, group-based communication interface errors, group-based communication browser cache hydration errors, failed connection attempts, and the like.

In some embodiments, example performance metrics also include performance metrics such as frame rate during different pre-defined time periods in a group-based communication browser session, switch time for switching group-based communication channels, switch time for switching group-based communication interfaces for different workspaces, time between receiving user input indicating sending of a group-based message and rendering acknowledgement of message sent, time between initiating the process of persisting group-based communication objects to a group-based communication browser cache, time to load group-based communication objects browser cache to group-based communication store, non-persistent storage usage for different subset of group-based application assets and group-based communication objects, persistent storage usage for group-based communication service cache and group-based communication browser cache, and the like.

In some embodiments, the client device 101 is also configured to collect performance metrics tied to specific metrics in each sub modules of the group-based communication browser session. In some embodiments, performance metrics collected will also be associated with whether the group-based communication browser session was rendering a group-based communication interface with group-based application assets stored in a group-based communication service cache, whether the client device was connected to the Internet, or other situations.

FIG. 10 shows a diagram illustrating example performance metrics collected related to initiating a group-based communication browser session. A cold boot refers to the situation where the group-based communication service cache is not available and the group-based communication browser session rendered the initial group-based communication interface using group-based application assets fetched from the group-based communication repository 107, for example, a situation similar to 3305 and 3307. For a cold boot, typical time frame between receiving a group-based communication browser session initiation request and finish fetching group-based application assets is smaller than 1000 milliseconds (ms) as illustrated in 10100. Typical time frame between receiving a group-based communication browser session initiation request and rendering the initial group-based communication interface is smaller than 3000 ms as illustrated in 10105. This time frame is not limited by the speed of Internet connection available to client device 101.

A warm boot refers to the situation where the group-based communication service cache is available and the group-based communication browser session rendered the initial group-based communication interface using group-based application assets fetched from the group-based communication service cache, for example, a situation similar to 3400. For a warm boot, typical time frame between receiving a group-based communication browser session initiation request and finish fetching group-based application assets is smaller than 300 ms as illustrated in 10200. Typical time frame between receiving a group-based communication browser session initiation request and rendering the initial group-based communication interface is smaller than 1000 ms as illustrated in 10205. This time frame is not limited by the speed of Internet connection available to client device 101.

An offline boot is a warm boot where the client device 101 is not connected to the Internet. As illustrated in 10300 and 10305, typical time frames for an offline boot is similar to a warm boot.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. One or more non-transitory computer-readable media storing computer-executable instructions that, when executed by a processor, perform a method for efficiently initiating a group-based communication client session on a group-based communication client device from cached group-based communication system objects within a group-based communication system, the method comprising:

responsive to a transition by the group-based communication client device from online status to offline status or from offline status to online status, determining whether a group-based communication system service cache and group-based communication system client cache are available;

in accordance with a determination that the group-based communication system service cache is available, fetching a group-based application asset set from the group-based communication system service cache;

in accordance with a determination that the group-based communication system client cache is available:
  fetching a group-based object set from the group-based communication system client cache in accordance with a data retrieval policy that defines a plurality of conditions for retrieving the group-based object set and one or more data types of data to be retrieved based on the plurality of conditions, wherein the data retrieval policy indicates a prioritization of retrieval of the group-based object set based at least in part on the group-based object set being a most-recently utilized group-based object set, and
  storing the fetched group-based object set to a group-based communication store;

determining that one or more stale objects in the group-based communication system client cache are stale based at least in part on a quantity of connections made to the group-based communication system without refreshing the one or more stale objects; and rendering a group-based communication interface at the group-based communication client device using the group-based application asset set and the group-based object set without reference to the one or more stale objects.

2. The non-transitory computer-readable media of claim 1, wherein determining that the one or more stale objects are stale comprises:
  querying the group-based communication system to obtain respective version indicators of the one or more stale objects.

3. The non-transitory computer-readable media of claim 1, wherein determining that the one or more stale objects in the group-based communication system client cache is stale involves checking an indication regarding a previous fetch action corresponding to when the one or more stale objects were fetched.

4. The non-transitory computer-readable media of claim 3, wherein the previous fetch action is based on one or more of:
  a timestamp;
  a connection count indicating the quantity of connections made to the group-based communication system; and
  respective version indicators of the one or more stale objects.

5. The non-transitory computer-readable media of claim 1, the method further comprising:
  in response to determining that one or more non-stale objects in the group-based communication system client cache has already been fetched, rendering at least a portion of the group-based communication interface using the one or more non-stale objects.

6. The non-transitory computer-readable media of claim 1, the method further comprising:
  in response to determining that one or more non-fetched objects in the group-based communication system client cache has not yet been fetched, rendering at least a portion of the group-based object set using a place holder object; and
  fetching an updated object set from the group-based communication system.

7. The non-transitory computer-readable media of claim 1, wherein:
  the most-recently utilized group-based object set is associated with a device previously used by a user.

8. A method for efficiently initiating a group-based communication client session on a group-based communication client device from cached group-based communication system objects within a group-based communication system, the method comprising:
  responsive to a transition by the group-based communication client device from online status to offline status or from offline status to online status, determining whether a group-based communication system service cache and group-based communication system client cache are available;
  in accordance with a determination that the group-based communication system service cache is available, fetching a group-based application asset set from the group-based communication system service cache;
  in accordance with a determination that the group-based communication system client cache is available:
    fetching a group-based object set from the group-based communication system client cache in accordance with a data retrieval policy that defines a plurality of conditions for retrieving the group-based object set and one or more data types of data to be retrieved based on the plurality of conditions, wherein the data retrieval policy indicates a prioritization of retrieval of the group-based object set based at least in part on the group-based object set being a most-recently utilized group-based object set, and
    storing the fetched group-based object set to a group-based communication store;
  determining that one or more stale objects in the group-based communication system client cache are stale based at least in part on a quantity of connections made to the group-based communication system without refreshing the one or more stale objects; and
  rendering a group-based communication interface at the group-based communication client device using the group-based application asset set and the group-based object set without reference to the one or more stale objects.

9. The method of claim 8, wherein determining that the one or more stale objects are stale comprises:
  querying the group-based communication system to obtain respective version indicators of the one or more stale objects.

10. The method of claim 8, wherein determining that the one or more stale objects in the group-based communication system client cache is stale involves checking an indication regarding a previous fetch action corresponding to when the one or more stale objects were fetched.

11. The method of claim 10, wherein the previous fetch action is based on one or more of:
  a timestamp;
  a connection count indicating the quantity of connections made to the group-based communication system; and
  respective version indicators of the one or more stale objects.

12. The method of claim 8 further comprising:
in response to determining that one or more non-stale objects in the group-based communication system client cache has already been fetched, rendering at least a portion of the group-based communication interface using the one or more non-stale objects.

13. The method of claim 8 further comprising:
in response to determining that one or more non-fetched objects in the group-based communication system client cache has not yet been fetched, rendering at least a portion of the application group-based object set using a place holder object; and
fetching an updated object set from the group-based communication system.

14. The method of claim 8 wherein:
the most-recently utilized group-based object set is associated with a device previously used by a user.

15. A system for initiating a group-based communication system client session, the system comprising:
a data store;
a processor; and
one or more non-transitory computer-readable media storing computer-executable instructions, that when executed by the processor, perform a method of efficiently initiating a group-based communication client session on a group-based communication client device from cached group-based communication system objects within a group-based communication system, the method comprising:
responsive to a transition by the group-based communication client device from online status to offline status or from offline status to online status, determining whether a group-based communication system service cache and group-based communication system client cache are available;
in accordance with a determination that the group-based communication system service cache is available, fetching a group-based application asset set from the group-based communication system service cache;
in accordance with a determination that the group-based communication system client cache is available:
fetching a group-based object set from the group-based communication system client cache in accordance with a data retrieval policy that defines a plurality of conditions for retrieving the group-based object set and one or more data types of data to be retrieved based on the plurality of conditions, wherein the data retrieval policy indicates a prioritization of retrieval of the group-based object set based at least in part on the group-based object set being a most-recently utilized group-based object set, and
storing the fetched group-based object set to a group-based communication store;
determining that one or more stale objects in the group-based communication system client cache are stale based at least in part on a quantity of connections made to the group-based communication system without refreshing the one or more stale objects; and
rendering a group-based communication interface at the group-based communication client device using the group-based application asset set and the group-based object set without reference to the one or more stale objects.

16. The system of claim 15, wherein determining that the one or more stale objects are stale comprises:
querying the group-based communication system to obtain respective version indicators of the one or more stale objects.

17. The system of claim 16, wherein determining that the one or more stale objects in the group-based communication system client cache is stale involves checking an indication regarding a previous fetch action corresponding to when the one or more stale objects were fetched.

18. The system of claim 17, the method further comprising:
in response to determining that one or more non-stale objects in the group-based communication system client cache has already been fetched, rendering at least a portion of the group-based communication interface using the one or more non-stale objects.

19. The system of claim 15, the method further comprising:
in response to determining that one or more non-fetched objects in the group-based communication system client cache has not yet been fetched, rendering at least a portion of the group-based object set using a place holder object; and
fetching an updated object set from the group-based communication system.

20. The system of claim 15, wherein:
the most-recently utilized group-based object set is associated with a device previously used by a user.

* * * * *